US006824462B2

(12) United States Patent
Lydon et al.

(10) Patent No.: US 6,824,462 B2
(45) Date of Patent: Nov. 30, 2004

(54) METHOD AND SYSTEM FOR EVALUATING SKILLS OF CONTESTANTS IN ONLINE CODING COMPETITIONS

(75) Inventors: Michael Lydon, Hebron, CT (US); John M. Hughes, Hebron, CT (US)

(73) Assignee: Topcoder, Inc., Glastonbury, CT (US)

( * ) Notice: Subject to any disclaimer, the term of this patent is extended or adjusted under 35 U.S.C. 154(b) by 4 days.

(21) Appl. No.: 10/377,343

(22) Filed: Feb. 28, 2003

(65) Prior Publication Data

US 2003/0130021 A1 Jul. 10, 2003

Related U.S. Application Data

(63) Continuation of application No. 10/041,393, filed on Jan. 8, 2002.

(60) Provisional application No. 60/260,610, filed on Jan. 9, 2001.

(51) Int. Cl.[7] .......................... G06F 17/00; G06F 19/00

(52) U.S. Cl. ................................. 463/9; 463/1; 463/42

(58) Field of Search ........................... 463/9, 1, 42, 40, 463/41

(56) References Cited

U.S. PATENT DOCUMENTS

| | | | | |
|---|---|---|---|---|
| 4,525,599 | A | 6/1985 | Curran et al. | |
| 5,779,549 | A | 7/1998 | Walker et al. | |
| 5,794,207 | A | 8/1998 | Walker et al. | 705/1 |
| 5,827,070 | A | 10/1998 | Kershaw et al. | |
| 5,916,024 | A | 6/1999 | Von Kohorn | |
| 5,933,811 | A | 8/1999 | Angles et al. | |
| 5,947,747 | A | 9/1999 | Walker et al. | |
| 6,010,403 | A | 1/2000 | Adam et al. | |
| 6,112,049 | A | 8/2000 | Sonnenfeld | |
| 6,264,560 | B1 | 7/2001 | Goldberg et al. | 463/42 |
| 6,293,865 | B1 | 9/2001 | Kelly et al. | |
| 6,356,909 | B1 | 3/2002 | Spencer | 707/10 |
| 6,397,197 | B1 | 5/2002 | Gindlesperger | 705/37 |
| 6,408,283 | B1 | 6/2002 | Alaia et al. | 705/37 |
| 6,513,042 | B1 | 1/2003 | Anderson et al. | |
| 6,569,012 | B2 | 5/2003 | Lydon et al. | 463/9 |
| 6,658,642 | B1 | 12/2003 | Megiddo et al. | 717/101 |
| 2001/0032189 | A1 | 10/2001 | Powell | 705/59 |
| 2001/0034631 | A1 | 10/2001 | Kiselik | 705/8 |
| 2001/0037281 | A1 | 11/2001 | French et al. | 705/37 |
| 2001/0039529 | A1 | 11/2001 | Hoffman | 705/37 |
| 2003/0192029 | A1 | 10/2003 | Hughes | |

FOREIGN PATENT DOCUMENTS

WO WO 97/39811 10/1997 ...................... 9/24

OTHER PUBLICATIONS

Annavajjala, Karuna. JAVA Challenge Software Project. College of Engineering and Mineral Resources at West Virginia University, Department of Computer Science and Electrical Engineering. Moregantown, West Virginia, 1999.*

(List continued on next page.)

*Primary Examiner*—Teresa Walberg
*Assistant Examiner*—Julie Brocketti
(74) *Attorney, Agent, or Firm*—Testa, Hurwitz & Thibeault, LLP

(57) ABSTRACT

This invention relates to a method and apparatus for providing a coding competition. In one embodiment, a method for providing a coding competition includes transmitting a coding problem to contestants, receiving computer code created by a contestant, determining a response of the computer code to test data, and evaluating the response of the computer code to the test data. In another embodiment, a method for evaluating a skill level of a contestant includes electronically communicating a coding problem to contestants, electronically receiving a software program in response to the coding problem from one of the contestants, evaluating the received software program, awarding points to the contestant based on the received software program, and determining a rating for the contestant for the competition based on the number of points awarded to the contestant.

27 Claims, 16 Drawing Sheets

1300
1304 1310 1312 1316
Top Coder
USER: cfedor RANK: 1200 STATUS: [TOP CODER]
1308 Main Options Active Contests Help
Lobby Disable Chat Collegiate Challenge Contest Manual
Search Disable Chat Scrolling Practice Room Register
Logoff Beta Test About
Current Contest: Beta Test 2 Round 1
Starts in 72:56:38 1320
1322 1324 1328
RATING KEY
3000 - 2500
2499 - 2000
1999 - 1500
1499 - 1000
0999 - 0000
Who's here (6)
Chat Area
System> cfedor has entered the room.
Search
Enter a username:
OK Cancel
Top Coder
Coder Info
1332
Stat: Value
Rating: 1200
Logged in: N
Last login: 2001-02-26 02:40:22:0
Quote:
Current contests: (none)
Ok

OTHER PUBLICATIONS

URCSC Computer Programming Contest. Rules [online]. Nov. 1999 [retrived on Jun. 26, 2002]. Retrieved from Internet: <URL http://www.mathes.richmond.edu/~urcsc/contest/rules2.html>.*

Blecourt, Sandra. The Legacy of Arpad Elo: The Development of a Chess–Raing System. Universiteit van Amsterdam. Dec. 1, 1998.*

"Professor Keeps Score When Top Programmers Compete" California State University, Sacramento. Apr. 8, 1999 [retrived on Jun. 16, 2003]. Retrieved from Internet: <URL http://wwwcsus.edu/news/program.html>.*

"Nebraska Wins Collegiate Computer Programming Regional to Qualify for World Finals" Scarlet. Nov. 20, 1998. [retrived on Jun. 16, 2003]. Retrieved from Internet: <URL http://www.unl.edu/scarlet/v834/v8n34 features.html>.*

Jones, Albyn. "International Soccer Ranks and Ratings" Statistics in Sports. vol. 2 Issue 1. Spring 2000, [retrived on Jun. 6, 2003]. Retrived from the Internet..*

"National Ratings System" Sep. 1993. [retrived on Jun. 6, 2003]. Retrived from the Internet URL:<http://members.ozemail.com.au/~aspansw/nrs.html>.*

"About CBDi" [online], [Retrieved on Jul. 29, 2003]. Retrieved from the Internet: http://www.cbdiforum.com/public/about.php3.

"ComponentSource: About Us" [online], [Retrieved on Jul. 29, 2003]. Retrieved from the Internet: http://www.componentsource.com/Marketplace/Home.asp?Type=AboutUs.

"Flashline 4 Provides Software Asset Management for Enterprise Programs" [online], [Retrieved on Jul. 30, 2003]. Retrieved from the Internet: http://www.flashline.com/fcm/fcm.jsp.

"About ComponentOn" [online], [Retrieved on Jul. 29, 2003]. Retrieved from the Internet: http://www.componentone.com/AboutcomponentOne.aspx.

"Rogue Wave Corporate Information" [online], [Retrieved on Jul. 29, 2003]. Retrieved from the Internet: http://www.roguewave.com/corp/.

"LogicLibrary Company Overview" [online], [Retrieved on Jul. 29, 2003]. Retrieved from the Internet: http://www.logiclibrary.com/companyoverview.html.

"/n software inc.—General Corporate Information" [online], [Retrieved on Jul. 29, 2003]. Retrieved from the Internet: http://www.nsoftware.com/company/corporateinfo.aspx.

"ILOG Corportae Profile" [online], [Retrieved on Jul. 29, 2003]. Retrieved from the Internet: http://www.ilog.com/corporate/profile/.

"What is SourceForge.net" [online], [Retrieved on Jul. 29, 2003]. Retrieved from the Internet: http://sourceforge.net/docman/display_doc.php/48 docid=6025&group_id=1.

"CollabNet Corporate Background" [online], [Retrieved on Jul. 30, 2003]. Retrieved from the Internet: http://www.collab.net/media/pdfs/collabnet_background.pdf.

Office Action for US Patent No. 6,569,012 dated Jun. 27, 2002.

Office Action for US Patent No. 6,569,012 dated Aug. 21, 2002.

Final Office Action for US Patent No. 6,569,012 dated Dec. 6, 2002.

Office Action for Patent Application Serial No. 10/377,344 dated Jul. 25, 2003.

International Search Report for International Patent Application Serial No. PCT/US03/10537 dated Jul. 23, 2003.

"IBM Patents Method for Paying Open Source Volunteers" posted on the internet at http://www.theinquirer.net/Default.aspx?article=13813 Retrived from the Internet on Jan. 29, 2004.

Web Pages from Scwatch.net: http://www.schwatch.net/modules.php?name=Forums&File=viewtopic&T=16 Retrieved from the Internet on Jan. 28, 2004.

Glickman, Mark E. *The Glicko–2 System for Rating Players in Head–to–Head Competition,* Jul. 2000, Retrieved from the internet on Oct. 23, 2003 at http://math.bu.edu/people/mg/ratings/glicko2desc.pdf.

"An Overview of PC$^2$" [online], [Retrieved on Aug. 23, 2003]. Retrieved from the Internet: http://hera.ecs.csus.edu/pc2/pc2desc.html. Revised Jun. 22, 2000.

"IOI Software Team" [online], [Retrieved on Aug. 23, 2001]. Retrieved from the Internet: http://olympiads.win.tue.nl/ioi/st/.

"Ed's Programming Contest Problem Archive" [online], [Retrieved on Aug. 23, 2003]. Retrieved from the Internet: http://www.karrels.org/Ed/ACM/index.html.

"ACM/IBM Quest for Java 2000" [online], [Retrieved on Aug. 23, 2002]. Retrieved from the Internet: http://www.acm.org/jquest/.

"JavaWorld Code Masters" [online], [Retrieved on Aug. 23, 2000]. Retrieved from the Internet: http://www.javaworld.com/javaworld/codemasters/f_index.html.

"Hack the Web for Fun!" [online], [Retrieved on Aug. 23, 2000]. Retrieved from the Internet: http://java.sun.com/contest/external/html.

"Brainbench the measure of achievement" [online], [Retrieved on Nov. 9, 2000]. Retrieved from the Internet: http://www.brainbench.com/xml/bb/homepage.xml.

"Problem Set Archive with Online Judge" [online], [Retrieved on Nov. 8, 2001]. Retrieved from the Internet: http://acm.uva.es/problemset/.

Lewis, "Tournaments become latest high–tech recruiting tool," The Boston Globe at C1, May 6, 2002.

Annavajjala, "JAVA Challegne Softare Project" Master's Thesis submitted to the Department of Computer Science and Electrical Engineering at West Virginia University.

Astrachan, "The Internet Programming Contest: A Report and Philosophy" Association for Computing Machinery, Feb. 1993.

"URCSC Computer Programming Contest" [online], [Retrieved on Jun. 26, 2002]. Retrieved from the Internet: http://wwwmathcs.richmond.edu/~urcsc/contest/rules2.html.

Blecourt, "The Legacy of Arpad Elo: The Development of a Chess Rating System" University of Amsterdam, Dec. 1, 1998.

U.S. Chess Federation [online], [Retrieved on Dec. 3, 2002]. Retrieved from the Internet: http://www.uschess.org/about/about/html.

Carlton, Jim. Strutting their data, geeks go to battle for bucks and glory. Wall Street Journal, Mar. 11, 1994, col. 4, pA1(W) & pA1(e), ISSN 0193–241.

Fink, Willian & Joyce Dick. Computer Programming Tournament as a Learning Experience. The Computer Education Quarterly. Summer 1989, vol. 11, Issue 2 pp. 46–52.

O'Sullivan, Kate, Testing Recruits. Net Style. Inc. Dec. 2000, pp. 149–152.

Flipcode. Coding contest [online]. May 2000 [retrieved on Jun. 26, 2002]. Retrieved from the Internet: URL:http://www.flipcode.com/contest.shtml.

The Eiffel Stuggle 2000. Call for participation [online]. Aug. 2000, retrieved on Jun. 26, 2002 . Retrieved from the Internet: URL: http://www.elj.com/eiffel/struggle2000/cfp/, entire document.

ICFP Functional Programming Contest, [online] 1998, [retrieved on Jun. 26, 2002]. Retrieved from the internet: URL: http://www.ai.mit.edu/extra/icfp–contest.

1999 ICFP Programming Contest, [online] 1999, [retrieved on Jun. 26, 2002]. Retrieved from the internet: URL: http://www.es.virginia.edu/~jks6b/ocfp/.

* cited by examiner

METHOD AND SYSTEM FOR EVALUATING SKILLS OF CONTESTANTS IN ONLINE CODING COMPETITIONS

CROSS-REFERENCE TO RELATED APPLICATIONS

This application is a continuation to co-pending U.S. patent application Ser. No. 10/041,393, entitled "Systems and Methods for Coding Competitions", filed on Jan. 8, 2002, which claims priority to U.S. provisional patent application Ser. No. 60/260,610, entitled "Systems and Methods for Coding Competitions", filed Jan. 9, 2001.

TECHNICAL FIELD

This invention relates to computer-based methods and systems for competing and, more particularly, to methods and systems providing coding competitions.

BACKGROUND INFORMATION

In the United States and elsewhere, computers have become part of people's everyday lives, both in the workplace and in personal endeavors. This is because a general purpose computer can be programmed to run a variety of software programs each providing different processing and networking functions. Computer programmers develop computer code. Some companies hire large numbers of computer programmers to develop code on the company's behalf.

Like many other activities, coding requires a collection of skills. For example, some coders are extremely skilled, and, for example, are remarkably accurate and efficient. Professional certifications provide information about the base skills possessed by an individual, but generally there is no objective way to easily distinguish highly-skilled coders from average coders. This lack of objective measure means that highly-skilled coders may not be compensated for their true worth. In addition, in the United States and elsewhere, workers considered to be "professionals," such as lawyers, accountants, doctors, and managers, command higher salaries than the general population. Meanwhile, highly skilled programmers, who typically have good education, significant responsibility, and relatively unique abilities, are treated like production and administrative staff, rather than professionals. This is also true for computer coders in other disciplines (e.g. hardware design, and other engineering disciplines).

In the hiring process, firms typically subject coders to an interview process that may even include some actual testing of candidates' coding skills. But it is very difficult for a company, even with some skills testing, to definitively identify those programmers who have the greatest skills, are the most accurate and efficient, and so on. This makes it difficult for a company that wants to hire premier coders to identify and hire them, and it makes it more difficult for premier coders to be hired at the compensation levels that they may deserve.

SUMMARY OF THE INVENTION

A need therefore exists for mechanisms for skilled coders to build marketability and raise their income to reflect the value their work product creates. In general, in one aspect of the invention, systems and methods for providing coding competitions address these and other goals. Through the provision of computer-based coding competitions, successful coding competition participants can be distinguished from other coders, which benefits both the coders and their employers. Recognizably better coders can command greater salaries, and employers have an objective means to compare candidates and find good coders. In some embodiments, good coders have incentives to participate as competitions provide one or more of entertainment, awards, and future employment opportunities.

In some embodiments, entities that wish to gain access to skilled coders sponsor the coding competitions. In some embodiments, a rating system is used to provide a metric that can be used to evaluate a programmer's proven skills, knowledge, and ability.

In various embodiments, coding competitions are provided "on-line," in the sense that they are provided using computers that communicate over a network. Coding competition participants, also referred to as contestants, use a client computer that communicates with a competition server. The contestants may be located anywhere in the world if (for example) the network is a global network such as the Internet, or the coding competition participants may be located nearby, even in the same room, if (for example) the network is a local area network.

In some embodiments, as part of a coding competition, a server computer provides to one or more contestants a computer coding problem (e.g. a test question) that requires each contestant to develop computer code. The computer code may be, for example, an entire computer application program or a large or small portion of a computer application program (e.g. a subroutine or a subsystem, one or more objects, etc.). The code may be written in a specific programming language (e.g. C++, Java, C#, Fortran, per, etc.), or may be coded in one of a choice of programming languages or coding formats.

The coding problem may require design and or analysis of the problem in addition to coding. The computer code may also be for something other than a computer application program; for example, it may be a design for a computer program, or it may be an electronic circuit design or implementation, or for another engineering design and/or implementation. The computer code may be a model that will be forward engineered into a machine readable format for testing purposes. The code developed by a contestant is generally referred to as computer code, regardless of whether it is all or a portion of an application program, or something else.

In some embodiments, portions of the coding competitions take place in virtual "rooms" in which two or more contestants compete. Each contestant in a virtual room receives a coding problem or problems, which problems may be of varying difficulty. Contestants write computer code in response to one or more of the presented coding problem(s). When a contestant's code is ready, the respective client computer transmits the contestant's computer code to a server for evaluation. The time the contestant took to complete the computer code may be recorded.

In some embodiments, the server evaluates the computer code, and assigns a number of points to the contestants' submission. In some embodiments, the competition includes multiple rounds in which the server evaluates contestant computer code for each round. The server may also determine a skill level rating or ratings for the contestant. The determination of skill level of contestants may, for example, result in the awarding of a prize to a contestant, present employment opportunities to the contestant, attract sponsorship for the competition, and present hiring opportunities to the sponsors of the competition.

In some embodiments, contestants submit the requested computer code responsive to the computer coding problems in a first phase of the competition, and the response time of the contestants is recorded. The computer code written by the contestants during the first phase of the competition is verified during a subsequent phase of the competition. The submitted code can be verified using predetermined test data as input. In addition, each contestant may have an opportunity to review the computer code submitted by other contestants, and to submit test data to be provided as input to the other contestants' computer code for verification of that code. In this way, contestants can challenge the work of the other contestants.

In one embodiment, one or more competitions are held among programmers in a forum setting, analogous to a spectator sport. The contestants are located near each other, and spectators can observe the competition, and watch the programmers in action. There are displays and other aids to enhance the spectator enjoyment of the competition. In another embodiment, in which the competition takes place via a global computer network such as the Internet, the competitions take place in a "virtual forum" setting, in which spectators can observe, via the computer network, the activity in the virtual room or rooms. In some embodiments, spectators (either locally or via the network) can not only observe a coding competition, but can participate, by submitting test data to be used as input to the competitors' submissions.

In one aspect of the invention, a method for providing a coding competition includes the steps of transmitting a coding problem to contestants over a communications network and receiving computer code created by one or more of the contestants in response to the transmitted coding problem over the communications network. The method also includes the steps of determining a response of the received computer code to test data submitted by a party other than the contestant and evaluating the determined response, where that party may be, for example, a system administrator or server, a judge, another contestant, a competition spectator, and so forth.

In one embodiment, the method includes the step of providing the test data as input to reference code and comparing output of the reference code to output of the received computer code. In one embodiment, the received computer code may be evaluated based on such factors as the correctness of the determined the response, the accuracy of the determined response, and the speed of the determined response. Points may be awarded to a contestant based on the evaluation of the determined response of the computer code to the test data. A rating may also be assigned to the contestant based on the points awarded, and also based on prior competition performance. In one embodiment, a contestant is assigned to a division, based on the contestant's rating. For example, the contestant may be assigned to one of a first division for contestants who have previously attained a first rating or greater, and a second division for contestants who have a rating substantially equal to zero or a rating below a predetermined division rating. There may be a third, fourth, and divisions, etc., depending on the number of contestants and the spread in skill level. The use of divisions keeps the competition interesting to the contestants.

In another aspect, a method for evaluating a skill level of a contestant includes the steps of electronically communicating a coding problem to contestants during a competition and electronically receiving computer code in response to the coding problem from one of the contestants during the competition. The method also includes the steps of automatically evaluating the received computer code and awarding points to the contestant based on the received computer code. The method additionally includes determining a rating for the contestant for the competition based on the number of points awarded to the contestant.

In some embodiments, the method includes determining an average rating for the competition based on previous ratings of the competition and a total number of contestants receiving the coding problem. The method can also include determining a competition factor for the competition based on previous ratings of the contestants, a total number of contestants receiving the coding problem, and volatility of the ratings of the contestants. In another embodiment, the method includes determining a maximum rating increase for the contestant. In yet another embodiment, the method includes estimating a probability of awarding a contestant more points than other contestants in the competition. The determination of a rating for the contestant may also include adjusting of the rating in smaller increments as frequency that the contestant has been rated increases.

In yet another aspect of the invention, a method for providing contestant information to a potential employer includes the steps of receiving contestant information from contestants for entry into on-line coding competitions and providing an on-line coding competition between contestants. The method also includes assigning a rating to each contestant based on performance in the on-line coding competition and providing some or all of the contestant information and the assigned ratings of one or more contestants to a potential employer of the contestant. In one embodiment, the method also includes awarding points to the contestant based on performance in the on-line competition. The contestant information may include such information as a home address, phone number, work address, e-mail address, professional experience, work history, and certain demographic information of the contestant. In another embodiment, a rating is assigned to a contestant based on the points awarded to the contestant.

In another aspect, a method for awarding a prize to a contestant includes providing an on-line coding competition among contestants and awarding a point value to each contestant based on performance in the competition. The method also includes awarding prizes to a subset of the contestants who have been awarded a point value above a predetermined prize point value. The prize awarded depends on the points awarded with respect to the predetermined point value. The prize can include, but may not be limited to a monetary award, an interview with a prospective employer, a tangible good, a job offer, or some combination.

In another aspect, a method for advertising in a coding competition includes receiving contestant information from contestants for entry into on-line coding competitions. The method also includes the steps of providing one or more on-line coding competitions between contestants and providing each contestant with one or more advertisement for viewing during the competition. The method additionally includes tracking the viewing time of each advertisement by each contestant and providing contestant information and the tracked viewing time of the advertisement to an advertiser.

In some embodiments, the contestant information is provided to the advertiser in the aggregate. For instance, the server provides the information that twenty coders having a rating above a predetermined number viewed the advertisement for a total time of thirty minutes. In other embodiments, the server provides advertisement to contestants based on contestant information. For instance, the server may provide an advertisement to contestants having Java programming experience while providing another advertisement to contestants having C++ programming experience.

In one aspect, an apparatus for providing a coding competition includes a web server communicating with a web browser. The web browser is used by a contestant to receive a competition request and enable the contestant to enter the coding competition using client software. The apparatus also includes a client interface server communicating with the client software. The client interface server enables transmission of a coding problem to the client software and reception of computer code in response to the coding problem. The apparatus additionally includes an application server in communication with the web server and the client interface server. The application server interprets client requests, competition requests, and/or the computer code. The apparatus also includes a contest server in communication with the application server. The contest server compiles the computer code submitted by contestants, executes the computer code, tests the computer code, and/or computes a rating for the contestant.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
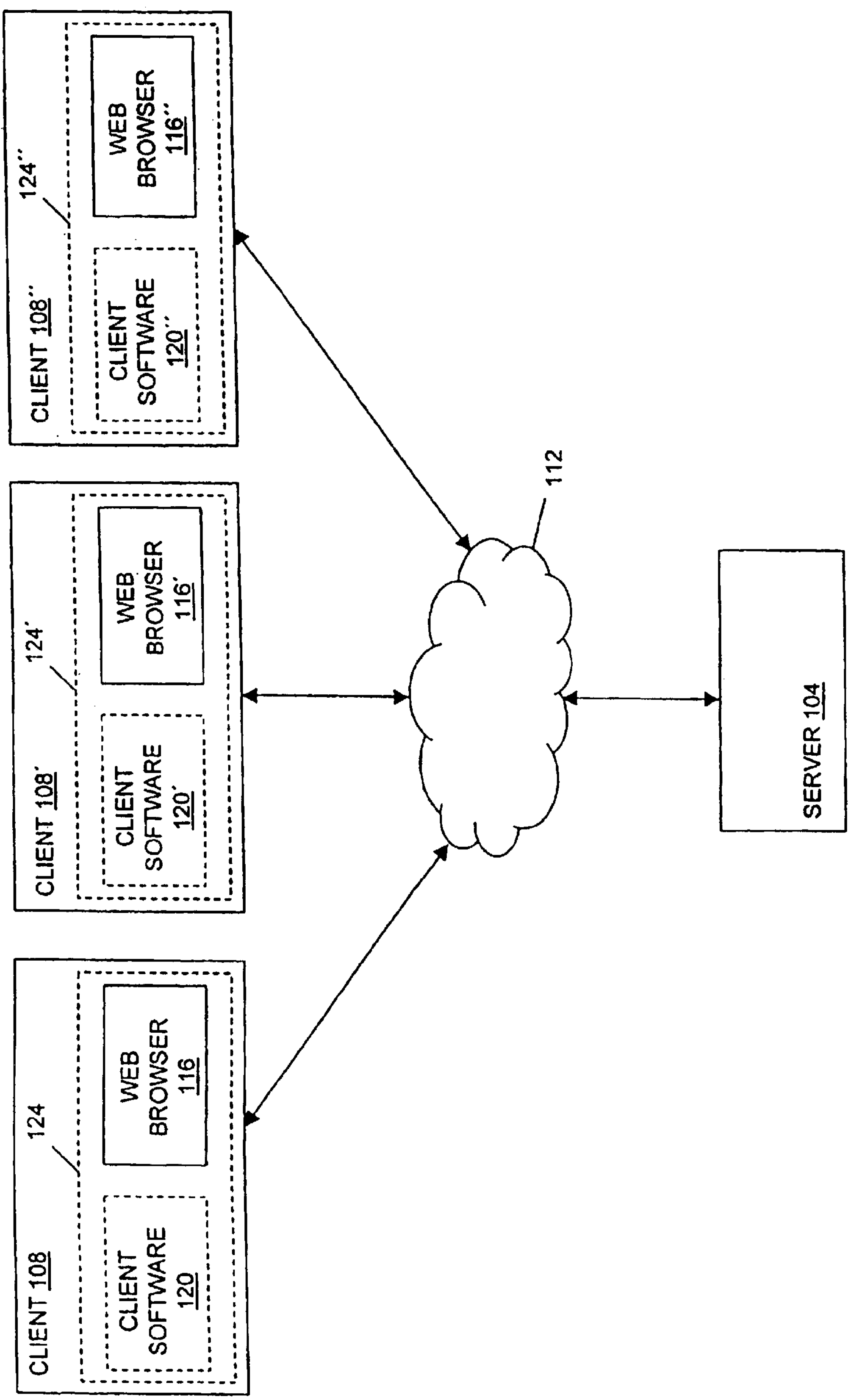
FIG. 1 is a block diagram of an embodiment of a coding competition system according to the invention.

Referring to FIG. 1, in one embodiment, a coding competition system 100 includes at least one server 104, and at least one client 108, 108', 108", generally 108. As shown, the coding competition system 100 includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 could also be implemented on such hardware as a smart or dumb terminal, network computer, wireless device, information appliance, workstation, minicomputer, mainframe computer, or other computing device, that is operated as a general purpose computer or a special purpose hardware device solely used for serving as a client 108 in the competition system 100.

Generally, clients 108 are operated by contestants and are used by contestants to participate in a coding competition. In various embodiments, the client computer 108 includes either a web browser 116, client software 120, or both. The web browser 116 allows the client 108 to request a web page (e.g. from the server 104) with a web page request. An example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, the client 108 automatically makes requests with the web browser 116. Examples of commercially available web browser software 116 are INTERNET EXPLORER, offered by Microsoft Corporation of Redmond, Wash., and NETSCAPE NAVIGATOR, offered by Netscape Communications Corporation of Mountain View, Calif.

In some embodiments, the client 108 also includes client software 120. The client software 120 provides functionality to the client 108 that allows a contestant to participate in a coding competition. The client software 120 may be implemented in various forms, for example, it may be in the form of a Java applet that is downloaded to the client 108 and runs in conjunction with the web browser 116, or the client software 120 may be in the form of a standalone application, implemented in a multi-platform language such as Java or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links, and so on. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Typical examples of networks that can serve as the communications network 112 include a wireless or wired ethernet-based intranet, a local or wide-area network (LAN or WAN), and/or the global communications network known as the Internet, which may accommodate many different communications media and protocols.

A computer coding contest provider operates a contest server 104, which interacts with clients 108. The server 104 is preferably implemented on one or more server class computers that have sufficient memory, data storage, and processing power and that run a server class operating system (e.g. SUN Solaris, GNU/Linux, MICROSOFT WINDOWS NT). Other types of system hardware and software than that described here could also be used, depending on the capacity of the device and the number of contestants and the size of the contestant base and the competitions. For example, the server 104 may be part of a server farm or server network, which is a logical group of one or more servers. As another example, there could be multiple servers 104 that may be associated or connected with each other, or multiple servers could operate independently, but with shared data. As is typical in large-scale systems, application software could be implemented in components, with different components running on different server computers, on the same server, or some combination.

Figure 2:
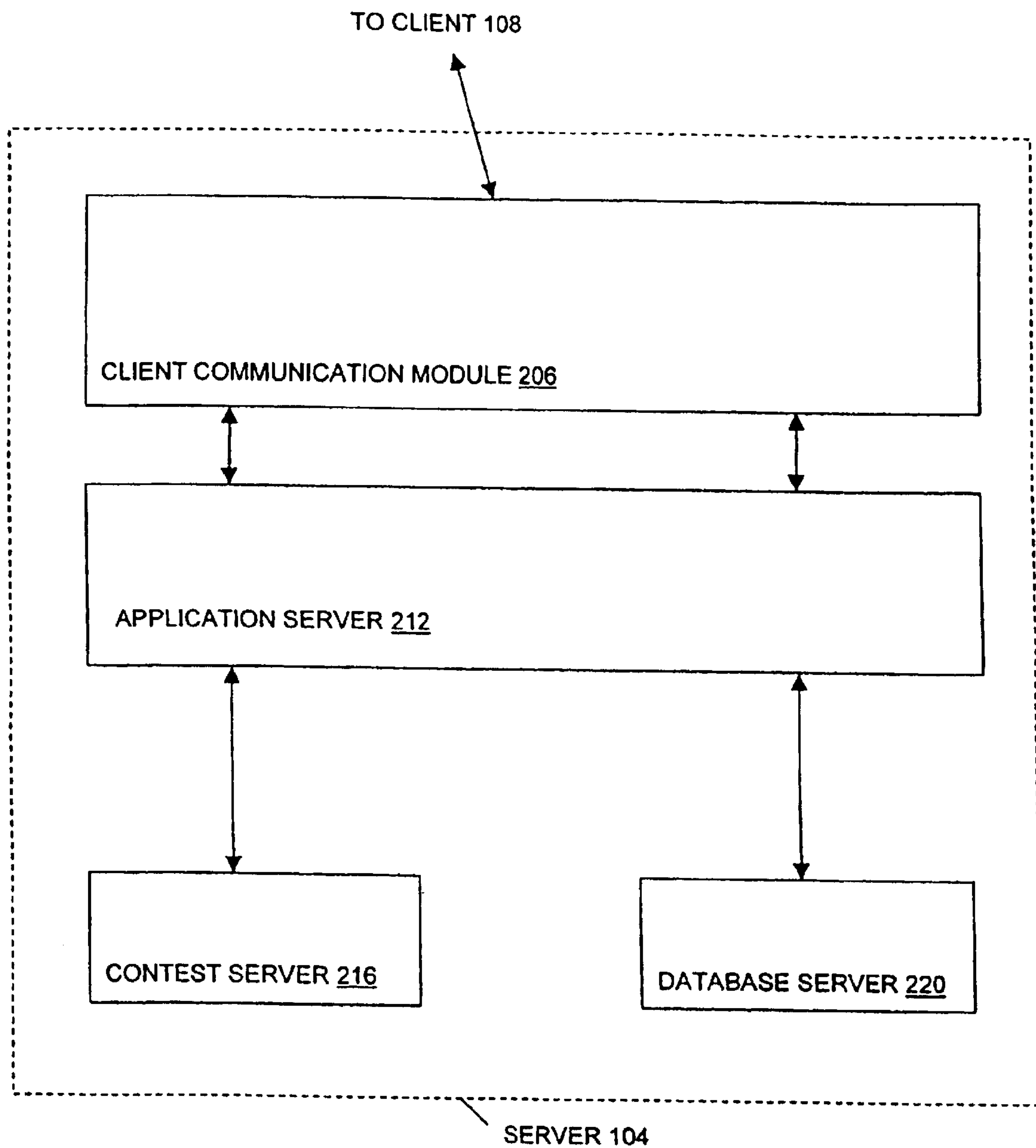
FIG. 2 is a block diagram of an embodiment of a server in the coding competition system of FIG. 1.

Referring to FIG. 2, in one embodiment, a server 104 includes a client communication module 206 that is the interface for communication with clients 108. The client communication module 206 can be implemented as software running on one or more servers, or may be implemented as a stand-alone server. In some embodiments, the client communication module 206 can provide an interface both to client software 120 and to a client web browser 116, so that, for example, a web browser 116 can be used by a contestant to access performance information, or to observe the progress of other contestants, and so on, while the client software 120 can be used for participating in a coding competition. The interface to each of the client software 120 and the client web browser 116 can be implemented separately or in combination. In other embodiments, the client communication module 206 can also communicate using other protocols or mechanisms.

The client communication module 206 communicates with the application server 212, which provides the main programming logic for the operation of the system. In one embodiment, the application server 212 is implemented as one or more application programs running on a server class computer, which may be the same or different computer as the client communication module 206. The application server 212 receives queries from contestants via the client communication module 206. The application server 212 also provides the coding competitions. For example, the application server 212 tracks the activity in the virtual rooms of a coding competition, and provides the coding problems for the competition. As another example, in some embodiments the application server 212 may provide a qualifying test, which is a preliminary requirement for participating in a coding competition as a contestant.

The server 104 also includes a contest server 216. The contest server 216 handles computationally intensive tasks associated with the coding competition, for example, the compilation and testing of code submitted by contestants in response to a coding problem. In one embodiment, the contest server 216 also assigns ratings to contestants. Generally, the interface between the application server 212 and the contest server 216 is designed such that the computationally intensive tasks are queued for processing on the contest server 216, thereby allowing the application server 212 to be responsive, even when loaded by one or more active coding competitions.

The server 104 also includes a database server 220, which stores data related to the coding competitions in one or more databases. For instance, the database server 220 stores competition information, statistics about the contestants, contestant information, server availability, and web traffic information. The database server 220 provides data to the application server 212. An example of the database server 220 is an INFORMIX DYNAMIC SERVER, offered by INTERNATIONAL BUSINESS MACHINES of Armonk, N.Y.

Figure 3:
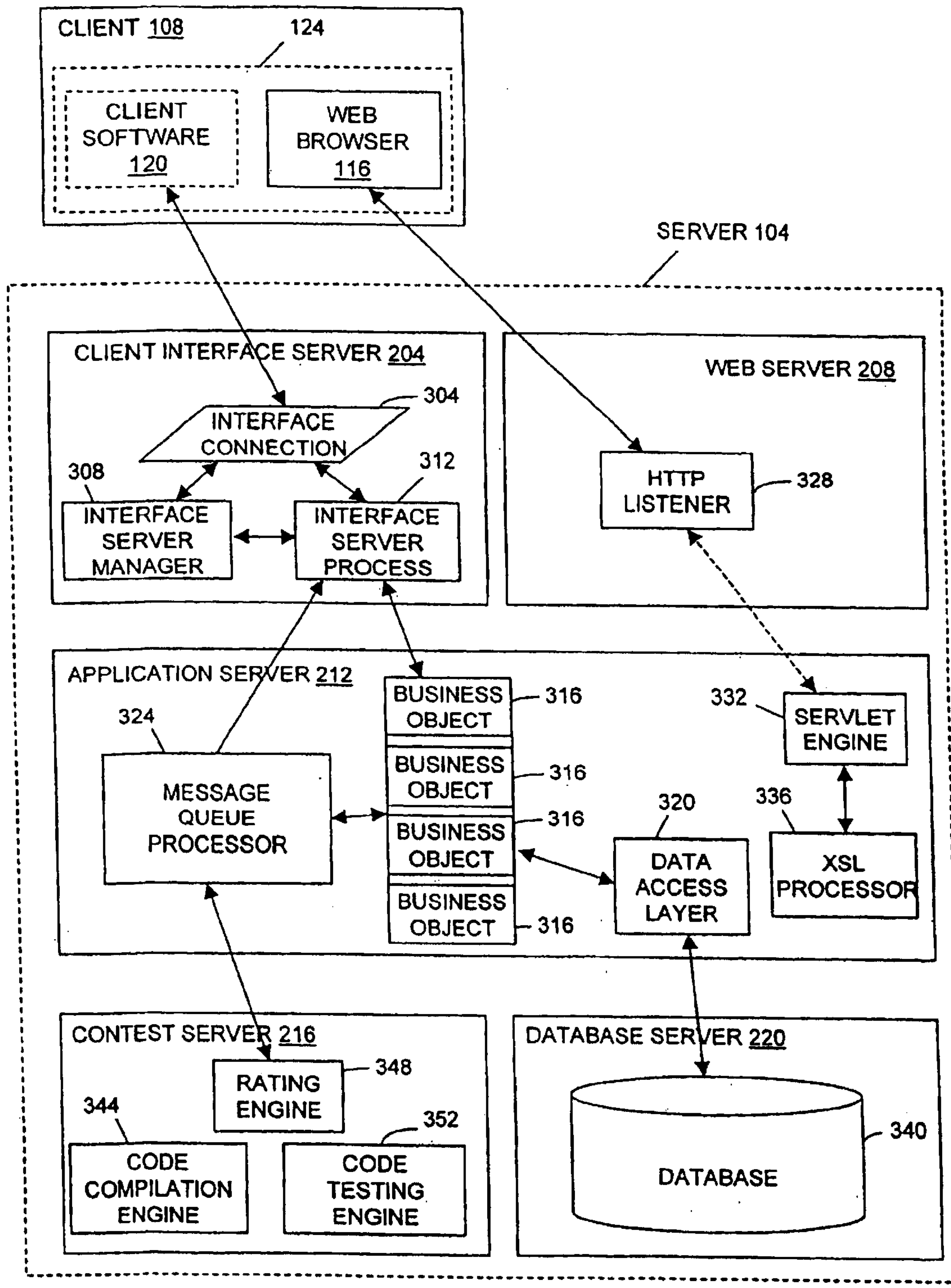
FIG. 3 is a more detailed block diagram of an embodiment of the server of FIG. 2.

Referring to FIG. 3, in one embodiment, the client communication module 206 (FIG. 2) includes an interface server 204, which provides an interface for communications with the client software 120. In one embodiment, the client interface server 204 is a software module executing on a server computer 104. In another embodiment, the client interface server is a stand-alone server computer in communication with other components of the server 104, such as the application server 212. In one embodiment, the client interface server 204 communicates with the client software 120 using a messaging protocol that runs over Transmission Control Protocol/Internet Protocol (TCP/IP) for communications between the client software 120 and the client interface server 204. The client interface server 204 is designed to maintain communications with the client software 120 of a large number of clients 108.

The client interface server 204 includes an interface connection 304. which provides the actual interface to the client software 120. The interface connection 304 receives messages from the client software 120 and provides them to an interface manager 308 and an interface server process 312. Likewise, the interface manager receives messages from the interface server manager 308 and the interface server process 312 and communicates those messages to the client software 120.

The interface server manager 308 manages the allocation of the interface connection 304 and the interface server process 312 to each client software 120. Each time a client 108 (via client software 120) connects to the server 104 (via client interface server 204), individual processes are assigned that will exist for the life of the client's connection. The interface server manager 308 handles this assignment process. The interface server manager 308 also stores any information regarding the number and nature of each of the client connections.

The interface server process 312 is the interface from the client interface server 204 to the application server 212. The interface server process 312 communicates with the client software 120 at a higher level than the interface connection 304. The interface server process 312 also communicates with the interface server manager 308. For example, the interface server manager 308 may instruct the interface server process 312 to obtain a particular application from the application server 212 for use in the coding competition.

Thus, when a contestant wants to transmit a request to the server 104, the client software 120 transmits the request over the communications network 112. The client software 120 communicates with the interface connection 304 to enable communication with the interface server process 312. The interface server process 312 receives the request from the interface connection 304 and determines what needs to occur to handle the request. The interface connection 304 also communicates the request to the interface server manager 308 as necessary to properly manage and allocate resources of the client interface server 204 to handle the request.

The interface server process 312 then transmits the request to the application server 212. The application server 212 includes business objects 316 to process the request. Each business object 316 manages one or more clients 108. Business objects 316 communicate with the client software 120 via the interface server process 312. Business objects 316 process requests from the client software 120. Examples of the implementation of a business object 316 include, for instance, a Component Object Model (COM) object and an Enterprise Java Bean (EJB) object.

If a request requires data access, the business objects 316 make requests, via a data access layer 320, to the database server 220. If the requests require processing by the contest server 216, the requests are passed on to a message queue processor 324, which queues requests for operation by the contest server 216, and sends the results back to the client software 102 via the interface server process 312.

In some embodiments, the client 108 (FIG. 1) can also communicate with the server 104 via a web browser. In such an embodiment, the communication module 206 (FIG. 2) also includes a web server 208. The web server 208 delivers web pages to the client 108 and provides an interface for communications between the web browser 116 and the server 104. Preferably, the web server 208 is an enterprise class web server, such as APACHE from the APACHE FOUNDATION, INTERNET INFORMATION SERVER from MICROSOFT CORPORATION, or NETSCAPE ENTERPRISE SERVER from NETSCAPE COMMUNICATIONS CORPORATION, running on one or more server class computers, which may be the same or different computers than the client interface server 204. The web server 208 may be implemented as any communications device that is capable of serving web content to client web browsers 116 over the communications network 112, and communicating with the other parts of the server 104, such as a personal computer, web appliance and so on. The web server 208 and the client interface server 204 are each in communication with the application server 212. The web server 208 provides the interface for web browsers 116 to communicate with the server 104. The web server 208 includes an HTTP listener 328 that receives HTTP requests from the web browser 116 and transmits HTTP replies to the browser 116. The HTTP listener 328 communicates with the application server 212 via a servlet engine 332.

The application server 212 communicates with web browsers 116 via the servlet engine 332. The servlet engine 332 uses Java servlets to generate web pages in response to web page requests. An XSL processor 336 interprets XSL style documents, which are used by the servlet engine 332 to produce HTML documents. Data requests are made by the servlet engine 332 to a business object 316, which makes data requests, if necessary, via the data access layer 320 to the database server 220. The servlet engine 332 combines XML objects and XSL style files to produce HTML files, which are then communicated, via the web server 208, to the client's browser 116.

The database server 220 includes one or more databases 340. The data access layer 320 communicates with the database 340 to retrieve data. The database 340 can be implemented using commercially available database software, with standard interfaces. The various types of information in the databases 340 can be stored in the same database or in different databases.

In one embodiment, the contest server 216 includes a code compilation engine 344. The code compilation engine 344 compiles contestants' computer code. Here, the term compilation is used in its broadest sense, and includes more than just translation of source code to object code. For example, if the competition system is used for hardware design, the compiler can include tools to translate code into a circuit design format suitable for simulation. The code compilation engine 344 can include any compiler. The choice of code compilation engine 344, however, affects the coding competition such that the compiler should supports the competition coding languages and testing environment. Thus, in one embodiment, the server 104 may have the code compilation engine 344 compile C or C++ code (e.g., a C++ compiler)using the GNU C compiler (GCC) from the FREE SOFTWARE FOUNDATION, Cambridge, Mass. In one embodiment, the server 104 has the code compilation engine 344 compile JAVA code using a compiler available from SUN MICROSYSTEMS of Mountain View, Calif. In another embodiment JAVA code is interpreted without compilation. In some embodiments, the code compilation engine 344 includes or has access to compilers for the various coding languages or formats to be used in the coding competition.

In one embodiment, the contest server 216 also includes a code testing engine 352, which tests the results of contestants' computer code against test data, such as a predetermined test suite. The test input may come from various sources. Generally the contest server 216 runs, interprets, or simulates the test environment, such that the test data can be provided as input, and the results obtained. Preferably, the compilers used by the compilation engine 344 compile code such that the code can be executed by the code testing engine 352. In one embodiment, the contest server 216 additionally includes a rating engine 348 to compute and manage the contestants' ratings. The rating engine 348 may implement any algorithm, such as an algorithm based on statistics, that accurately represents a contestant's skill level relative to other contestants. Each of these tasks, code compilation, code testing, and rating generation, are computation intensive. Requests for these operations are queued by the message queue processor 324, and provided to the engines 344–352 in order of receipt. This allows the business objects 316 to complete the requests without blocking or waiting for the engines 344–352.

The de-coupling of these computation-intensive tasks in the contest server 216 from the operation of the other servers allows for scalability of the competition system. Any combination of the servers, processors, or engines (e.g., web server 208, application server 212, message queue processor 324, rating engine 348) can be implemented on the same or independent processors or computers relative to the other servers, processors, or engines. Several instances of the contest server 216 can execute in parallel (on the same or different computers) to respond to requests from the message queue processor 324. Additional processing capacity can be added quickly to handle these tasks more quickly if the system comes under heavy load, as could happen during a competition. Thus, a useful feature of this embodiment of the server 104 is that it can reliably support a computation-intensive coding competition with large numbers of contestants.

Figure 4:
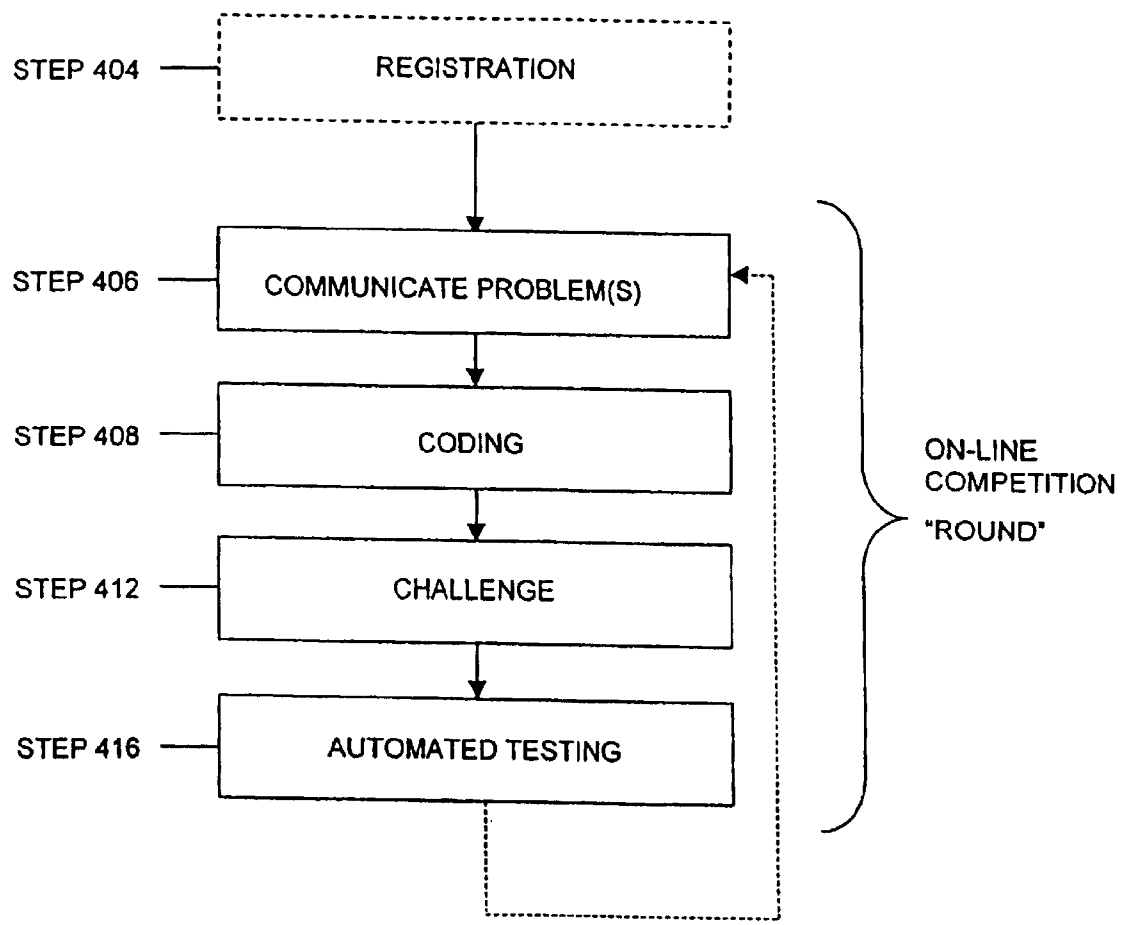
FIG. 4 is a flowchart of the operation of an embodiment of the server for a coding competition.

Referring to FIG. 4, in one embodiment, the interaction of contestants with the server 104 (via the client 108) can be summarized generally by four steps. The contestant optionally registers with the server 104 (STEP 404). Preferably, the contestant provides information about herself in the registration process. Examples of contestant information can include such information as the contestant's name, contact information (i.e., mail address, telephone number, email address), a username or "alias" for use on the site, work experience, education background, certain demographic information, specific technical skills, whether the contestant is currently seeking a job, and/or geographic preferences of the contestant for employment. The alias is how the contestant will be known on the system to other contestants and spectators. The registration may also include, for instance, each contestant completing a qualifying test, or qualifying round, as discussed in more detail below.

After registering, the contestant can participate in a competition. In one embodiment, competitions are ongoing on the server 104 and held continuously. In other embodiments, competitions are held at set times, or when announced by the competition administrator. To capture some coders' attention and participation, for example, it may be better to hold competitions periodically after normal business hours. In one embodiment, contestants enter a competition at any time. For example, a contestant may connect to the server 104 and may enter a competition at that time if there are other suitable contestants available to compete. In one embodiment, this type of competition is referred to as a "pick-up" competition because a contestant can enter the competition at any time that other contestants are available. Competitions may be scheduled such that the server 104 automatically begins the competition at the set time (or some predetermined delay after the predetermined time).

A competition first involves communication of the coding problem (STEP 406). The server 104 transmits one or more computer coding problems to each contestant via the client 108 in the competition. The contestant reviews the one or more coding problems and develops computer code as a solution to the coding problem (STEP 408). The contestant may select one or more of the transmitted coding problems to solve. The contestant may select a first problem to solve, and then select another problem to solve. For simplicity, one coding problem may be described, but it is intended that the principles can be extended to more than one.

In one embodiment, before a contestant submits computer code as a final answer to the coding problem, the contestant can submit the code for compilation by the server 104, and for execution with test data provided by the contestant. In this way, the contestant can compile and/or run the computer code to determine, for example, how well the computer code operates, the speed at which it operates, and the accuracy of the computer code. The contestants can additionally view, for example, the result of compilation and the results of the execution with the test input submitted by the contestant.

In one embodiment, the server 104 records the elapsed time taken by the contestant in the coding stage. The server 104 starts a coding timer upon transmission of the computer problem to the contestants (via the clients 108) and ends the coding stage when contestant submits a solution, or when the coding timer reaches a predetermined coding stage time (i.e. a time-out). Moreover, the server 104 may adjust the predetermined coding time depending on the level of difficulty of the computer problem or problems.

In some embodiments, after submission of code, a challenge portion of the competition follows (STEP 412). During a challenge period, a challenging party can challenge a contestant's computer coding. In various embodiments, the challenging party can be one or more of: another contestant, a spectator of the coding competition, a judge or other party who has the assigned task of submitting test data to verify code submissions, or the server 104. In one embodiment, the challenging party challenges the computer code by submitting test data to the server 104 for input to the executed computer code. The server 104 uses the test data to determine the correctness of the computer code. With the test data, the challenging party attempts to induce incorrect execution of the computer code, for example, generating an incorrect output, or halting execution due to error. Based on the computer code's response to the test data, the server 104 can determine if the computer code execution is acceptable. In some embodiments, the server 104 ends the challenge when a challenge timer reaches a predetermined challenge time. Although described as independent timers, the timers such as the challenge timer and the coding timer, may be implemented with a single timer or multiple timers.

The server 104 may also conduct automated testing of the submitted code (STEP 416) in which the code is submitted to one or more automated tests from a predetermined test suite. In one embodiment, the server 104 submits all submitted computer code to one or more automated tests. The server 104 may randomly choose a test from the predetermined test suite or may choose a test based on, for example, a predetermined order or the computer code's performance with respect to an earlier challenge. In another embodiment, the challenge stage includes automated testing. In another embodiment, the automated testing precedes the challenge stage.

In one embodiment, a competition includes a contestant registering and then participating in two or more competition rounds, where each round consists of problem communication (STEP 406), coding (STEP 408), challenge (STEP 412), and testing (STEP 416). Alternatively, a competition round may include a subset of problem communication (STEP 406), challenge (STEP 412), and testing (STEP 416). In some embodiments, the order of challenge (STEP 412) and automated testing (STEP 416) is reversed and in other embodiments, these steps overlap or take place in parallel. In one embodiment, a coding competition consists of a predetermined number of rounds, where the number varies from competition to competition. Thus, a competition may only consist of one round. A competition with a number of rounds may also be referred to as a tournament. As discussed below, the server 104 can additionally assign or adjust each contestant's rating after the entire competition is complete (e.g., after the round(s) of the competition are complete). A round can include communication of two or more problems, with overlapping problem communication, challenge, and automated testing.

Figure 5:
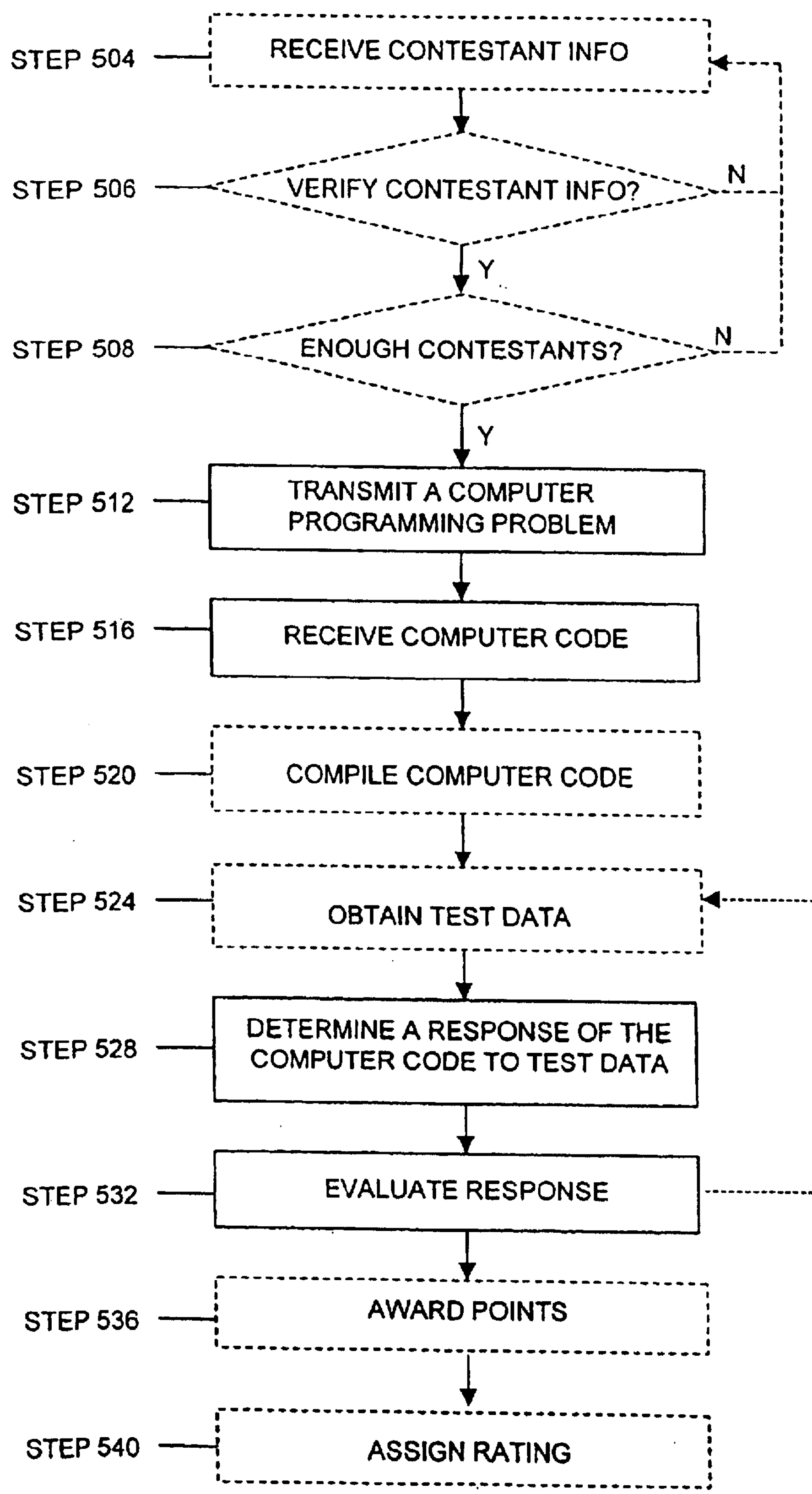
FIG. 5 is a more detailed flowchart of the operation of an embodiment of the server for a coding competition.

Referring to FIG. 5, in one embodiment, the server receives contestant information from the client (if it is the first competition for the contestant) or the database (STEP 504). In some embodiments, the server 104 does not enable the contestant to move to the next step until required contestant information is received by the server 104. In some embodiments, the server 104 requests additional contestant information from the client 108 at an appropriate time, such as during an intermission of a coding competition. In other embodiments, if a contestant has registered with the server 104 but has never competed in a competition, the contestant may not have to complete additional information before competing in a competition. Thus, in one embodiment, all contestants provide a minimum of registration information prior to competing.

In another embodiment, the server 104 hosts a practice room. The practice room is a room in which one or more contestants can familiarize themselves with the competition format (e.g., the format for answering coding problems). In one embodiment, inside the practice room, the server 104 provides sample coding problems to one or more contestants. The contestant(s) attempt to develop code in response to these problems, which may help familiarize them with the competition system.

In one embodiment, the server 104 determines if enough contestants are available to begin the coding competition (STEP 508). If there are not, the server 104 waits until a predetermined number of contestants connect (via a client 108) to the server 104 for participation in a coding competition. In some embodiments, the server 104 may wait a predetermined time after establishing connections with two contestants (via clients 108) and then begin a competition thereafter. For instance, if the server 104 schedules a coding competition to begin on a particular date and time, the server 104 may only wait a predetermined amount of time (e.g., ten minutes) past the scheduled time before beginning the competition, as long as more than one contestant is going to participate in the competition. If no contestants or only one contestant submits contestant information at the scheduled time, the server 104 may automatically cancel or postpone the coding competition to a later date or time.

When a predetermined number of clients 108 associated with registered, qualified contestants are available to participate, the server 104 transmits a coding problem to each contestant via the client 108 (STEP 512). In one embodiment, the coding problem requires a contestant to create one or more computer programs, subroutines, and/or tasks. In one embodiment, the coding problem involves developing code in one or more specified languages or formats.

The server 104 can also impose a time limit on its acceptance of responses to the coding problem. In one embodiment, the server 104 displays a response timer on the client 108 when the server 104 transmits the coding problem. The server 104 sets the response timer to a predetermined response time to denote the time limit in which the server 104 accepts computer code in response to the coding problem. When the response timer expires, the contestant can no longer submit computer code.

In some embodiments, a contestant chooses one coding problem from several transmitted coding problems. The server 104 transmits several coding problems to the client 108, where each coding problem has a different level of difficulty with respect to other coding problems. If a contestant submits a correct solution to a coding problem having a higher level of difficulty, the more difficult choice can result in an awarding of more points relative to a correct solution to a coding problem having a lower level of difficulty. After the contestant submits code in response to one problem, the contestant may be able to work on another coding problem. In another embodiment, the coding problems offered in a competition have the same degree of difficulty and therefore have the same ascribed point value. In another embodiment, there is only one problem that must be responded to, with no choice.

The contestant may compile (if necessary) and test her code before submitting the code to the server 104 as a final response. The contestant can thus validate her code before submission. By compiling and/or testing the computer code, the contestant may be able to, for example, improve the computer code, determine errors in the computer code, determine the accuracy of the computer code, and determine the efficiency of the computer code. When the code is ready, the contestant then submits her computer code to the server 104. The server 104 receives the computer code from a contestant (STEP 516). The server 104 compiles the code (STEP 520) if necessary. If the server 104 receives executable or interpretable computer code (e.g. a JAVA program) from a contestant, there may be no need for a compilation step.

In one embodiment, the server 104 waits a predetermined amount of time to receive computer code from each contestant. Once this predetermined coding time has elapsed, the server 104 does not accept code submissions. In other embodiments, the server 104 continues to accept code submissions, but the points available for the submission decrease over time.

The server 104 verifies the correct execution of the submitted computer code (e.g., does it generate correct output. execute without errors in all cases, etc.). The server does this by obtaining test data (STEP 524), which may come from various sources. In one embodiment, the server 104 has predetermined test data to provide as input to the submitted coding problems. Such test data is provided to the server with the coding problem. In another embodiment, the server can generate test data using information about the types of input that can be provided to the computer code (STEP 524). As described above, test data may also be provided as a challenge by other contestants, or in some embodiments, by spectators or judges (FIG. 4, STEP 412). The server 104 may choose the contestant's computer code to verify based on one or more factors, for example, the order of submission of computer code to the server 104, the order of test data provided to the server 104, the current ranking of the submitting contestant, the current amount of points awarded to the contestant in this competition, as described below, randomly, or in a predetermined order. In one embodiment, in order to enable this automated verification of computer code responses, when test questions are provided to the server 104 for use in a coding competition, a reference computer code 636 as well as predetermined test data are provided to the server 104 along with the test question. The reference program 636 and the test data are stored with the test question for use in this manner.

The server 104 executes the code with the test data as input and determines the computer code's response (STEP 528). In one embodiment, the server 104 can display the results of the execution of the computer code with the test data as input to contestants and spectators. In another embodiment, the test data used and the results obtained are stored in a database for later viewing and verification.

In one embodiment, the server 104 generates test data and subjects the code to the server's data as part of the automated testing stage. Even if the server 104 previously provided or generated test data as a challenge, in one embodiment the server 104 inputs one or more additional test datum to the computer code.

The server 104 evaluates the response of the computer code (STEP 532). In one embodiment, the server 104 evaluates the response by comparing the response to an acceptable response or a range of acceptable responses. Further, if the contestant's computer code fails or produces errors when executing with the test data as input, the server 104 may deduct points from the submitting contestant. Moreover, if the computer code properly executes with the test data, the server 104 may award points to the submitting contestant. In some embodiments, the server 104 may also add or deduct points from a contestant who submits challenge test data for a particular computer code if the challenged computer code executes correctly in response to the test data. In other words, the system will give points for a successful challenge and deduct points for an unsuccessful challenge of a contestant's computer code.

In one embodiment, in which the communications network 112 is the Internet, competitions take place in a "virtual forum" setting, in which spectators can observe, via the computer network, the activity in a virtual competition room. Spectators may be users of a client 108 that have registered with the server 104 who are not participating in a particular coding competition, or may be observers who have not yet registered with the server 104. In some such embodiments, besides the server 104 and other contestants competing in the coding competition, spectators (either locally or via the network) can participate in the competition by submitting test data to the server 104 for input into the contestants' submissions. Thus, spectators can help judge the worthiness of the submissions.

Figure 6:
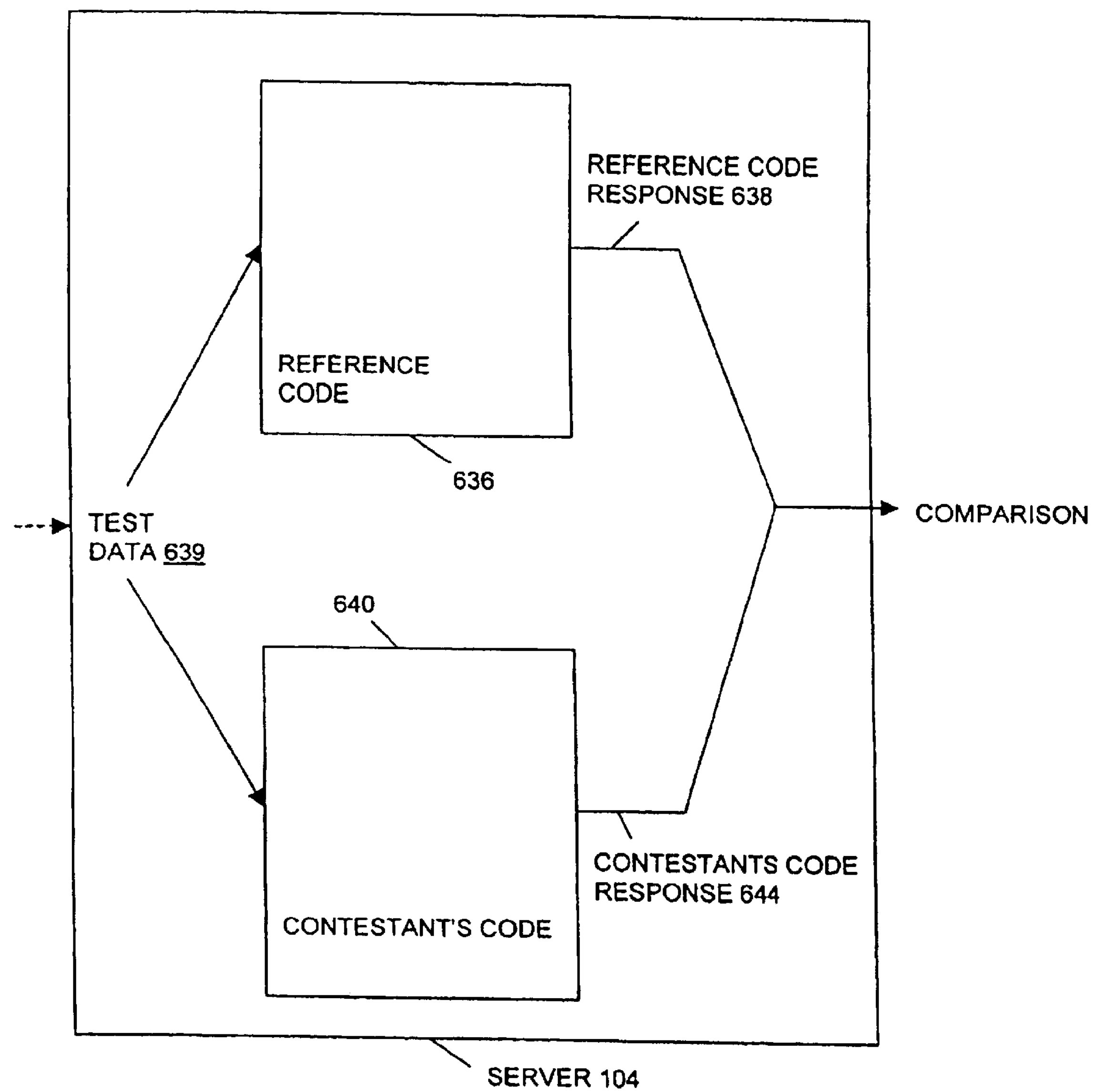
FIG. 6 is a block diagram of an embodiment of the evaluation performed by the server of a computer code's response to test data.

Also referring to FIG. 6, in one embodiment, the server 104 uses reference code 636 to verify the operation of a contestant's computer code 640. Preferably, the reference program 636 is a predetermined solution to a coding problem. Test data 639 is provided as input both to the reference program 636 and the contestant's code 640. The test data may be predetermined data stored by the server 104, data that is generated by the server 104, data provided by another contestant, or test data provided by another party, such as a spectator, judge, administrator, etc. The reference program 636 produces a reference response 638 during (or following) execution with the test data as input. The contestants' computer code 640 also produces a response 644 when it is executed with the test data as input. The server 104 then compares the two responses 638, 644 to determine the correctness of the computer code response 644. The server 104 may also measure the time that the reference program 636 and the contestant's computer code 640 take to produce an associated response 638, 644 to determine the efficiency of the contestant's computer code 640. This comparison may be repeated for various input test data, with each test input coming from the same or a different source.

Referring again to FIG. 5, following the evaluation of the contestant's computer code, the server 104 awards points to the contestant (STEP 536). In one embodiment, each coding problem has a maximum point value associated with it. In one embodiment, the server 104 awards less points than the maximum point value that the coding problem is worth. In particular, the server 104 awards points to a contestant based on, for example, some or all of the correctness of the contestant's code response 644 (e.g. compared with the reference response 638), the accuracy of the contestant's computer code response 644, the speed that the computer code 640 produces the computer code response 644, and/or the recorded time at which the server 104 received the computer code 640 from the contestant.

In one embodiment, the number of points awarded depends on the level of difficulty of the coding problem. The server 104 may also adjust the point value awarded to a contestant based on the time that the server 104 receives the contestant's computer code 640 compared to the time that the server 104 provides the coding problem. In one embodiment, the total number of points awarded to a contestant is as shown in Equation 1:

$$\text{Total points awarded}=MP*((0.3+(0.7*TT^2))/(10*PT^2+TT^2)) \qquad \text{Equation 1}$$

In Equation 1, PT is the time a contestant spends coding a problem (i.e., producing the computer code), TT is the total time allocated for coding all computer problems in this part of the competition, and MP is the maximum points available for the computer coding problem. In one embodiment, the maximum number of points available is a frame of reference for the server 104 that is not practically achievable by a contestant. More specifically, for a contestant to be awarded the maximum number of points, a contestant would have to spend almost zero seconds reading the coding problem, coding the computer code 640, and submitting the computer code 640 to the server 104. For example, if there is one problem that is allocated 600 seconds (10 min.), and it takes a contestant 300 seconds (5 min.) to code the problem, then TT=600, PT=300, and approximately 52% of the total points MP will be awarded if the code executes correctly.

In one embodiment, the contestant receives this number of points (e.g. 52% of the total available) for the computer code if the computer code executes correctly with all test data, and the contestant receives no points if the code does not execute correctly with all test data. In other embodiments, partial credit is given for partially correct code. For example, in one embodiment, the code receives the number of points based on a percentage of test data. In another embodiment, the number of points received is scaled based on the percentage of test data with which the code executes correctly. In some embodiments, such as when the competition is a tournament consisting of multiple rounds, the server 104 tracks the points awarded to each contestant for each round. The server 104 may also calculate a running total for each contestant, summing the points awarded in each completed round of the competition. This running total can be used to eliminate low-scoring contestants.

In one embodiment, after the completion of one or more competition rounds, the server 104 assigns a rating to the contestant (STEP 540). Typically the assignment of the rating occurs when a competition or tournament is complete. For example, a competition may consist of one round, as described above with respect to FIG. 4, or may consist of multiple rounds, such as in a tournament. Thus, in the embodiment in which the competition consists of one iteration of the problem communication, coding, challenge, and testing steps, or more than one round, the server 104 assigns a rating to each contestant after awarding total points to each contestant. In one embodiment in which the competition includes multiple rounds (e.g., a tournament), the server 104 assigns a rating to each contestant after the contestants complete the tournament.

The ratings provide a metric that can be used to chart a programmer's skill, knowledge, and ability. As described in more detail below, in one embodiment the server 104 bases the contestant's rating on the total number of points awarded to the contestant during the competition (e.g., having one or multiple rounds). The rating can be a score, a grade, or any other type of rating technique.

Figure 7:
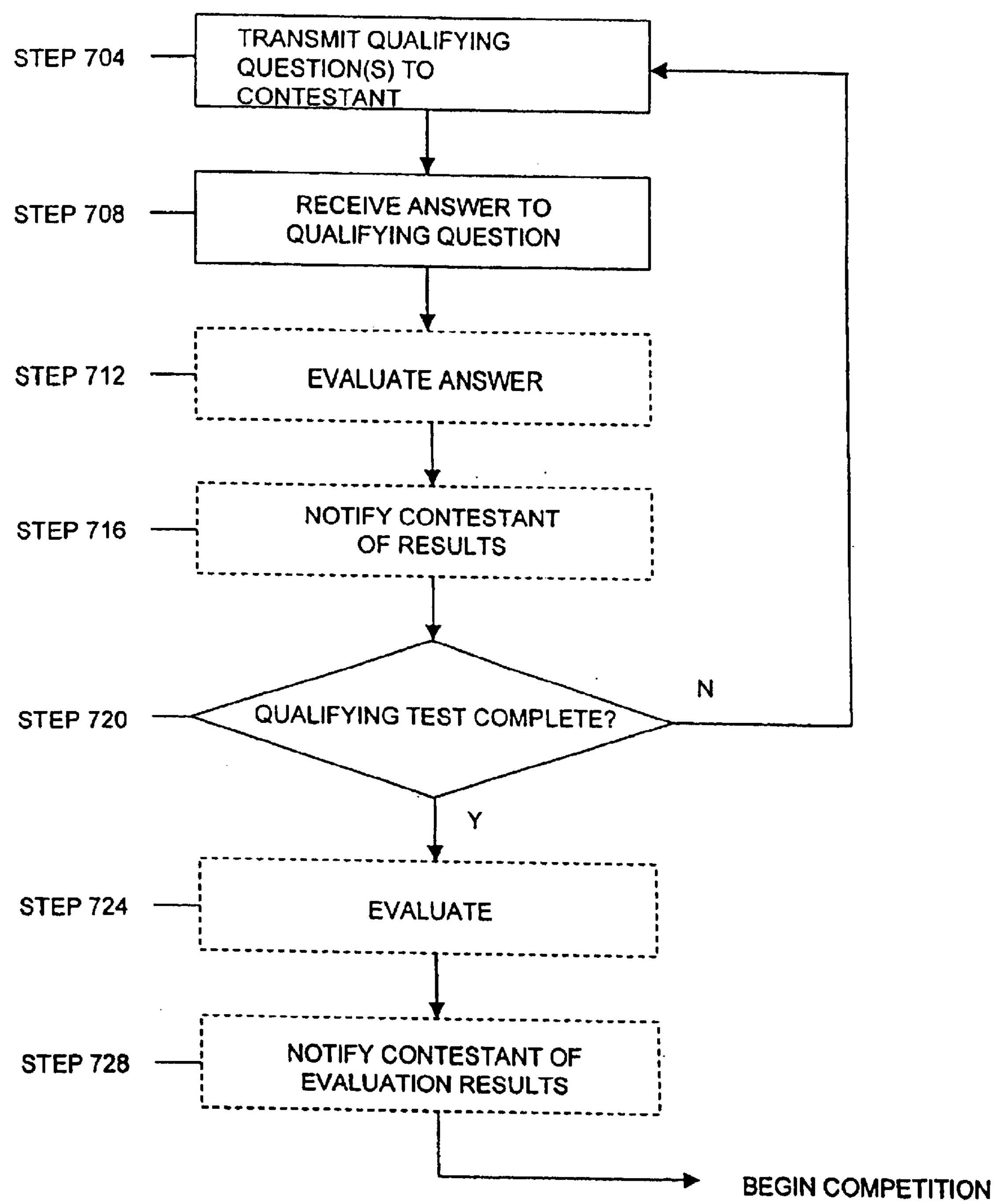
FIG. 7 is a flowchart of the operation of an embodiment of the server for a qualifying test before the coding competition of FIG. 4.

Referring to FIG. 7, in one embodiment, a contestant undergoes a qualifying test as part of the registration process. The qualifying test can take place at the time of registration, or at a later time. During the qualifying test, the server 104 transmits one or more qualifying test questions to a contestant (STEP 704). In one embodiment, the contestant has to complete the qualifying test in a predetermined qualification time, which the server 104 displays on the client 108. In one embodiment, the predetermined qualification time is a time for the entire qualification test. Alternatively, the predetermined qualification time is a time requirement for one qualifying test question. In one embodiment, if the predetermined qualification time elapses, the server 104 transmits the next question in the qualifying test. In another embodiment, the server 104 terminates the qualifying test. The server 104 may also time both the entire qualifying test and an answer to each qualifying test question.

The questions may be, for example, multiple choice questions, questions requiring one word answers, or a question that requires that the contestant write computer code. Preferably, the questions are computer-related and correct response indicates a base level of skill. The questions may, however, be related to any subject, such as, for instance, mathematics, science, literature, history, or logic. Moreover, in one embodiment, the qualifying test questions have varying degrees of difficulty. Further, the server 104 may or may not display these degrees of difficulty to the contestant, and the contestant may, before viewing the qualifying test question, have a choice of which qualifying test question to answer based on its level of difficulty.

The contestant (via the client 108) answers each qualifying test question and then submits the answer to the server 104. The server 104 receives the answer (STEP 708) from the client 108. In one embodiment, the server 104 evaluates the received answer (STEP 712). In another embodiment, once the contestant answers the test question, the client 108 (e.g., the web browser 116 or the client software 120) automatically transmits the answer to the server 104 and the server 104 provides the client 108 with the next qualifying test question (STEP 704).

During the evaluation of the received answer, the server 104 may, for instance, determine the value of the received answer based on a predetermined set of correct answers and the speed at which the contestant responded to the qualifying test question. The server 104 may additionally determine a number of points to award to the contestant for the contestant's answer to the qualifying test question, or qualifying test question score, based on the previous determinations (e.g., correctness of the received answer). After this evaluation, in one embodiment, the server 104 notifies the contestant about the result(s) of the evaluation of the contestant's answer, such as, for example, the correctness of the contestant's answer or the qualifying test question score. In one embodiment, the server 104 notifies the contestant via a qualification results window displayed on the client 108 as the qualification test progresses. In another embodiment, the server 104 only notifies the contestant about the result(s) of the evaluation of the qualifying test at its completion.

The server 104 determines if the qualifying test is complete (STEP 720). The server 104 establishes that the qualifying test is complete based on, for example, when the predetermined qualification time for the qualifying test elapses, when the server 104 receives an answer to the final qualifying test question, or when a predetermined time for the final qualifying test question elapses. If the server 104 determines that the qualifying test is not complete after the reception of the contestant's answer to the current qualifying test question, the server 104 subsequently transmits the next qualifying test question in STEP 704. If, however, the server 104 determines that the qualifying test is complete after the reception of the contestant's answer to the current qualifying test question, the server 104 determines if this contestant qualifies for a coding competition.

Thus, after determining that the qualifying test is complete, the server 104 may then evaluate the answers submitted by the contestant (STEP 724). In this embodiment, the server 104 can then notify the contestant of the results of the evaluation (STEP 728). This notification may be a notification as to the correctness of each question, the time taken to answer each question, the time taken to complete the qualifying test, the level of difficulty of each test question, the qualifying test question score, total points awarded for the qualifying test, or qualifying test score, and/or a minimum number of points needed to qualify for the coding competition. The points awarded per question may depend on if the answer was correct, the time taken to receive the submitted answer, and the level of difficulty of the question. In one embodiment, participants have the option of taking the qualifying test a second time should they want to try to improve their score to increase their chances of qualifying.

In one embodiment, after determining that the qualifying test is complete, the server 104 allows the user to enter a coding competition. In this embodiment, the qualification test is an opportunity for a new contestant to become familiar with the competition environment and practice before a coding competition begins.

Figure 8:
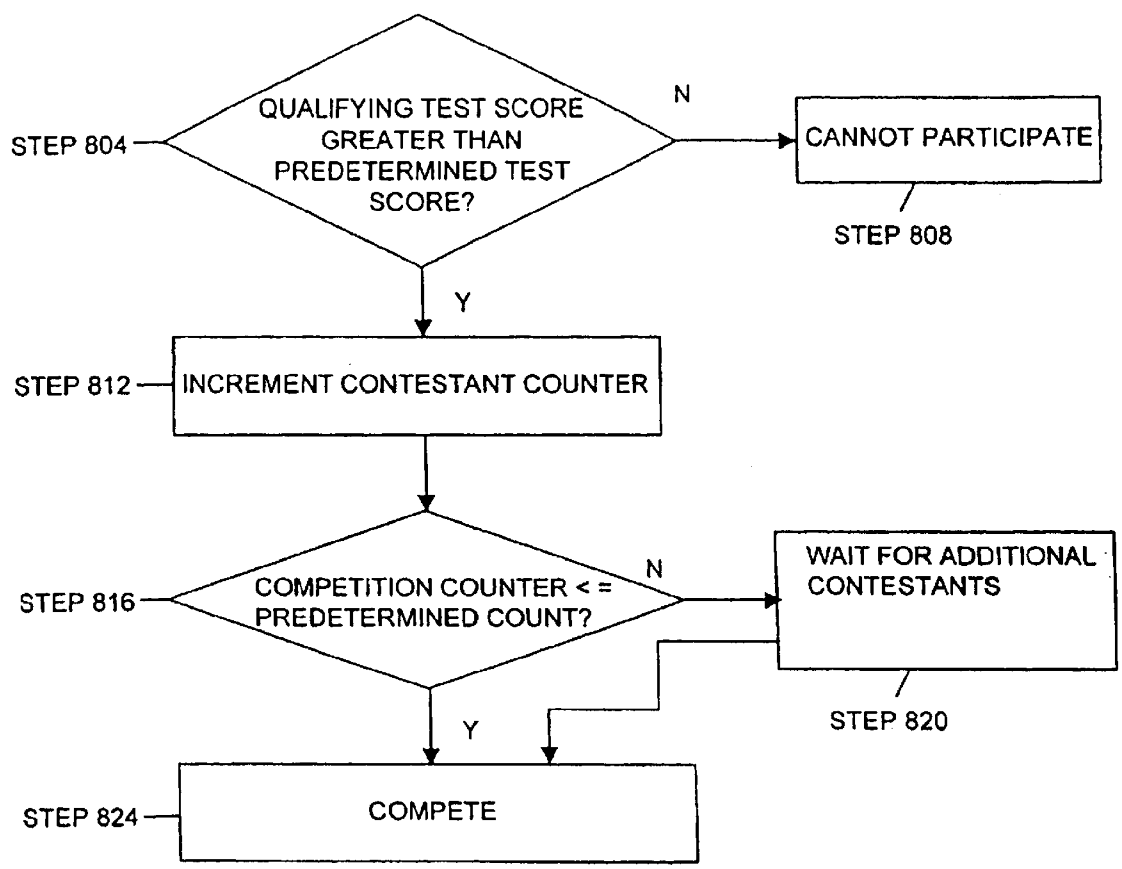
FIG. 8 is a flowchart of the operation of an embodiment of the server for completion of the qualifying test of FIG. 7.

Referring to FIG. 8, in determining whether a contestant can participate in a coding competition, the server 104 looks at the qualifying test score of the contestant, and the number of contestants already participating.

The server 104 first determines if the qualifying test score is greater than a predetermined threshold qualifying test score (STEP 804). The contestant can not participate in the coding competition (STEP 808).

If the qualifying test score is greater than the predetermined qualifying test score, the server 104 then increments a contestant counter, which represents the number of contestants who have qualified for the coding competition (STEP 812). If, however, the server 104 determines that the contestant counter is less than or equal to the predetermined maximum contestant count (STEP 816), the contestant is allowed to compete (STEP 824).

In one embodiment, the registration process includes the server 104 seeding each contestant into a division. In one such embodiment, the server 104 allocates two divisions, a first division for contestants who have previously attained a rating greater than a predetermined division rating and a second division for contestants who have either not attained a rating (i.e., who have never competed before or have no data associated with a competition) or have a rating below the predetermined division rating. In one embodiment, the server 104 provides coding problems having a lower degree of difficulty to the second division relative to the problems provided to the first division.

For example, the server 104 could use a predetermined division rating value of 1200. Thus, the server 104 seeds all contestants who have a rating less than 1200 into the second division and all contestants who have a rating greater than 1200 into the first division. Moreover, in one embodiment, the server 104 assigns all contestants again after the completion of a competition. Thus, after a competition, if a contestant previously in the first division has a rating below 1200 after this competition, the server 104 places the contestant in the second division. Further, the server 104 can select the prize that the contestants are competing for depending on the division that the contestants are competing in.

The server 104 may further divide up each division into one or more "rooms" or group of rooms. For example, the server 104 can divide up the second division into unrated rooms having only contestants who have never been assigned a rating, and rated rooms having contestants who have been assigned a rating below the predetermined division rating.

Figure 9:
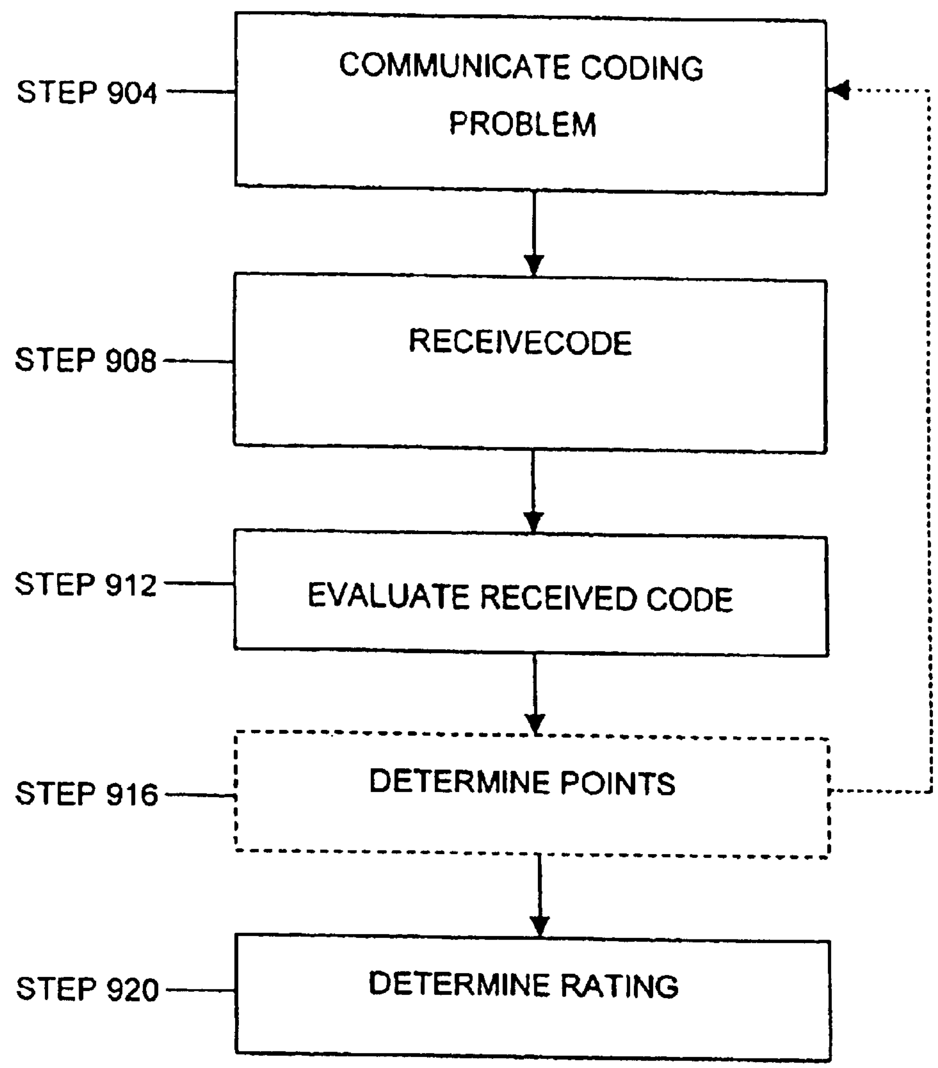
FIG. 9 is a flowchart of the operation of an embodiment of the server for assigning a rating in the coding competition.

Referring to FIG. 9, the server 104 quantifies a contestant's coding abilities after the completion of some or all of a competition by rating the contestant. In one embodiment, the server 104 determines the rating based on the total points awarded to the contestant in the competition.

As above, the server 104 electronically communicates a coding problem to each contestant (STEP 904). The server 104 then receives a contestant's computer code in response to the problem (STEP 908). The server 104 then evaluates the received code (STEP 912).

Based on these evaluations of the code, the server 104 then awards points to the contestant (STEP 916). Once some or all of the competition is complete (e.g., one round or multiple rounds), the server 104 determines each contestant's rating (STEP 920). In one embodiment, to determine a contestant's rating, the server 104 first determines a contestant's previous rating if the contestant has been rated previously. Preferably, the server 104 retrieves the ratings of the contestants from, for instance, the database server 220. The rating includes a rating value and a volatility value. The volatility value indicates the consistency of the contestant's ranking over time.

In one embodiment, the server 104 calculates the average rating for the contestants participating in a competition using Equation 2:

$$AveRating = \frac{\sum_{i=1}^{NumCoders} Ratings_i}{NumCoders} \quad \text{Equation 2}$$

The server 104 also calculates a competition factor using Equation 3:

$$CF = \sqrt{\frac{\sum_{i=1}^{NumCoders} Volatility_i^2}{NumCoders} + \frac{\sum_{i=1}^{NumCoders} (Rating_i - AveRating)^2}{NumCoders - 1}} \quad \text{Equation 3}$$

In Equations 2 and 3, NumCoders is the number of contestants in the competition and $Rating_i$ is the rating without the volatility of the ith contestant in the competition before the competition. Further, $Volatility_i$ is the volatility of the ith contestant in the competition before the competition.

Next, the server 104 determines the skill of the contestant, as shown below in Equation 4.

$$\text{Skill} = \frac{\text{Rating} - 1200}{1200} \quad \text{Equation 4}$$

The Rating is the contestant's rating before the competition, or a previous rating. In one embodiment, if the server 104 determines that the contestant has not been previously rated, the server 104 does not calculate the skill. In a further embodiment, the server 104 assigns a predetermined skill level to a contestant (e.g. 1). The server calculates the deviation of a contestant from other contestants using Equation 5, where Volatility is the volatility of the contestant before the competition:

$$\text{Deviation} = \frac{\text{Volatility}}{1200} \quad \text{Equation 5}$$

The server 104 then estimates the probability ($WP_i$ for i from 1 to NumCoders) of the server 104 awarding a contestant a higher score relative to the other contestants in the competition. In one embodiment, the server 104 estimates this probability by using the contestant's expected performance rating on a range of good to bad days. The server 104 models each contestant's performance as a normal distribution with a mean (the rating) and standard deviation (the volatility). Using this model, the server 104 converts a contestant's performance into a percentage using the normal distribution, so that 50% represents expected performance and 25% represents better three days out of four, etc. Then, to estimate the probability that the contestant beats contestant i, the server 104 divides the range from 0% to 100% into 1% blocks, and the server 104 takes the midpoint of each block and computes the corresponding performance. The win probability is the number of blocks where the midpoint favors contestant i. If two contestants have the same number of blocks in which the midpoint favors one contestant (i.e., a tie), the server 104 splits the block between both contestants.

In particular, the psuedo-code function to estimate the probability of contestant A beating contestant B, where f is the inverse of the standard normal function, is shown below:

```
WinProbability(SkillA, DeviationA, SkillB, DeviationB)
  Set count, a, b to 0. Set fa=SkillA+f((a+0.5)/100)
    *DeviationA.
  Set fb=SkillB+f((b+0.5)/100)*DeviationB.
  While (a<100):
    If fa<fb:
      Add 100-b to count, Increment a,
      Set fa=SkillA+f((a+0.5)/100)*DeviationA,
  If fa==fb:
      Add 100-b-0.5 to count, Increment a, Increment
        b,
      Set fa=SkillA+f((a+0.5)/100)*DeviationA,
      Set fb=SkillB+f((b+0.5)/100)*DeviationB
    If fa>fb:
      Increment b
      Set fb=SkillB+f((b+0.5)/100)*DeviationB
  Return count, where count is the win probability.
```

The server 104 then calculates the expected rank of the contestant using Equation 6:

$$ERank = \sum_{i=1}^{NumCoders} WP_i \quad \text{Equation 6}$$

Where Wpi is the Win Probability of a coder against each other coder. The server 104 also calculates the expected performance of the contestant using Equation 7:

$$EPerf = -\Phi\left(\frac{ERank - .5}{NumCoders}\right) \quad \text{Equation 7}$$

In Equation 7, Φ is the inverse of the standard normal function. The server 104 then determines the actual performance of each contestant:

$$APerf = -\Phi\left(\frac{ARank - .5}{NumCoders}\right) \quad \text{Equation 8}$$

In Equation 8, ARank is the actual rank of the contestant in the competition based on score (1 for first place, NumCoders for last place). If the contestant's score was equal to another contestant, the rank is the average of the positions covered by the tied contestants. The server 104 then calculates the "performed as" rating of the contestant using Equation 9:

$$\text{PerfAs} = \text{OldRating} + CF * (\text{APerf} - \text{EPerf}) \quad \text{Equation 9}$$

The server 104 also determines the weight of the competition for the contestant in Equation 10 and a cap for the contestant in Equation 11:

$$\text{Weight} = \frac{\mathit{TimesPlayed}+1}{.75*\mathit{TimesPlayed}+.4} - 1 \quad \text{Equation 10}$$

$$\text{Cap} = 150 + \frac{1500}{1+\mathit{TimesPlayed}} \quad \text{Equation 11}$$

In Equation 10, TimesPlayed is the number of times the contestant has been rated before. In one embodiment, to stabilize the higher rated contestants, the Weight of contestants whose rating is between 2000 and 2500 is decreased 10% and the Weight of contestants whose rating is over 2500 is decreased 20%. The server 104 then determines the new volatility of the contestant using Equation 12 and the new rating of the contestant with Equation 13:

$$\mathit{NewVolatility} = \sqrt{\frac{\mathit{Volatility}^2 + \text{Weight}*(\mathit{CF}*(\mathit{APerf}-\mathit{EPerf}))^2}{1+\mathit{weight}}} \quad \text{Equation 12}$$

$$\mathit{NewRating} = \frac{\text{Rating} + \text{Weight}*\mathit{PerfAs}}{1+\text{Weight}} \quad \text{Equation 13}$$

In one embodiment, if |NewRating−Rating|>Cap, the server 104 adjusts NewRating so that it is at most Cap different than Rating. Moreover, in some embodiments, the server 104 stores any of the above mentioned values, such as the Rating, Volatility, and Number of times previously rated. Additionally, in one embodiment, ratings of new contestants are provisional before competing in a coding competition.

Thus, in the embodiment just described, the server 104 does not adjust a contestant's rating drastically from one performance in a coding competition if the contestant has performed and been rated in many other coding competitions or rounds of coding competitions. The server 104 may also determine a maximum rating increase for each contestant to help stabilize a contestant's rating from one coding competition to another. In one embodiment, the server 104 displays each contestant's ratings on the web site of the coding competition. However, in another embodiment the server 104 only enables registered contestants and sponsors to view the ratings of contestants.

TABLE 1 illustrates three examples of coding problems transmitted by the server 104 to contestants. As shown in the three examples, coding problems may include notes to assist the contestant in writing a solution to the problem. Also, coding problems may provide one or more examples of correct output of the computer code that solves the problem.

TABLE 1

| Coding problem | Example | Value |
|---|---|---|
| Implement a class Finances, which contains a function timeLeft. TimeLeft is passed 3 int values. The initial value of the bank account is initialValue. Interest is compounded monthly at a rate of interest percent. Every month monthly dollars is taken out from the account (immediately after the Interest has been added). timeLeft must return an int that is the number of months the account can support the full monthly withdrawal. If the account will last longer than 1200 months, the function should return 1200. The method signature is: int timeLeft (int initialValue, int interest, int monthly). Note: initialValue and monthly are > or equal to 0 and < or equal to 100,000. Interest is > or equal to 0 and < or equal to 1000. | (100, 0, 100) −> 1<br>(200, 1, 300) −> 0<br>(3453, 8, 200) −> 1200 | 250 |
| Implement a class Fraction, which contains a method getXSmallest. The method is passed two integers: an index and a maximum denominator. The program should find all fractions of the form a/b where b is less than or equal to the maximum denominator and a/b is less than 1 and then return the index-th smallest of these fractions. The method should return the fraction as a double value, rounded to 3 decimal points (use the supplied formatDouble function). Note: If the index value is > the number of fractions that are less than 1, the method should return 1. Fractions should not be simplified. ½ and 2/4 are two unique fractions, despite their equal double values. The class and method must be declared as public. The index must be between 1 and 70, inclusive. The max denominator must be between 2 and 12, inclusive. | If index = 3 and max denominator—4, all the fractions of the form a/b are ¼, ⅓, ½, 2/4, ⅔, ¾, and the method should return the third smallest, as a double: 0.5. | 500 |
| Implement a class Numbers that contains a method pairwisePrimes. The method inputs an int (num) and returns the number of ways the number can be written as the sum of three distinct integers that are pairwise relatively prime; that is, no pair of the three integers has a common factor > 1. Note: num is > 0 and < or equal to 40. One of the three distinct integers can be 1; Numbers are Pairwise Relatively Prime if they share no factor GREATER than 1. | num = 8: 8 can be written as 1 + 2 + 5 and 1 + 3 + 4 and the method should return 2. num = 18: the method should return 14 | 1000 |

The coding problems shown in TABLE 1 have different levels of difficulty. These levels of difficulty are depicted as the different point values of each coding problem. For instance, a contestant can choose a 250 point coding problem to earn a maximum of 250 points for a correct solution. However, another contestant may choose a 1000 point coding problem, which has a higher level of difficulty relative to a 250 point question, to earn a maximum of 1000 points for a correct solution. Thus, in one embodiment, a contestant having a higher degree of skill can amass points more rapidly than a contestant having a lower degree of skill by selecting coding problems with higher point values (and therefore higher levels of difficulty). In one embodiment, a server 104 assigns a higher rating to a contestant that amasses a higher total point value.

In one exemplary embodiment, multiple coding problems are available to all of the contestants in a virtual room. The contestants are given a choice of which problem to work on. Once a contestant views a problem, the timing on that problem begins. When the contestant completes the code that is a response to one problem, and submits it to the server, the contestant can begin work on a second problem, and then the third, and so on, depending on the number of problems amount of time that is allocated to coding in the competition. In some embodiments, the contestants do not see the problems, but only the point values, and the contestants select a problem to work on based only on the point value of the problem. Thus, each contestant makes a judgement about his abilities in deciding which coding problem to work on first.

Figure 10:
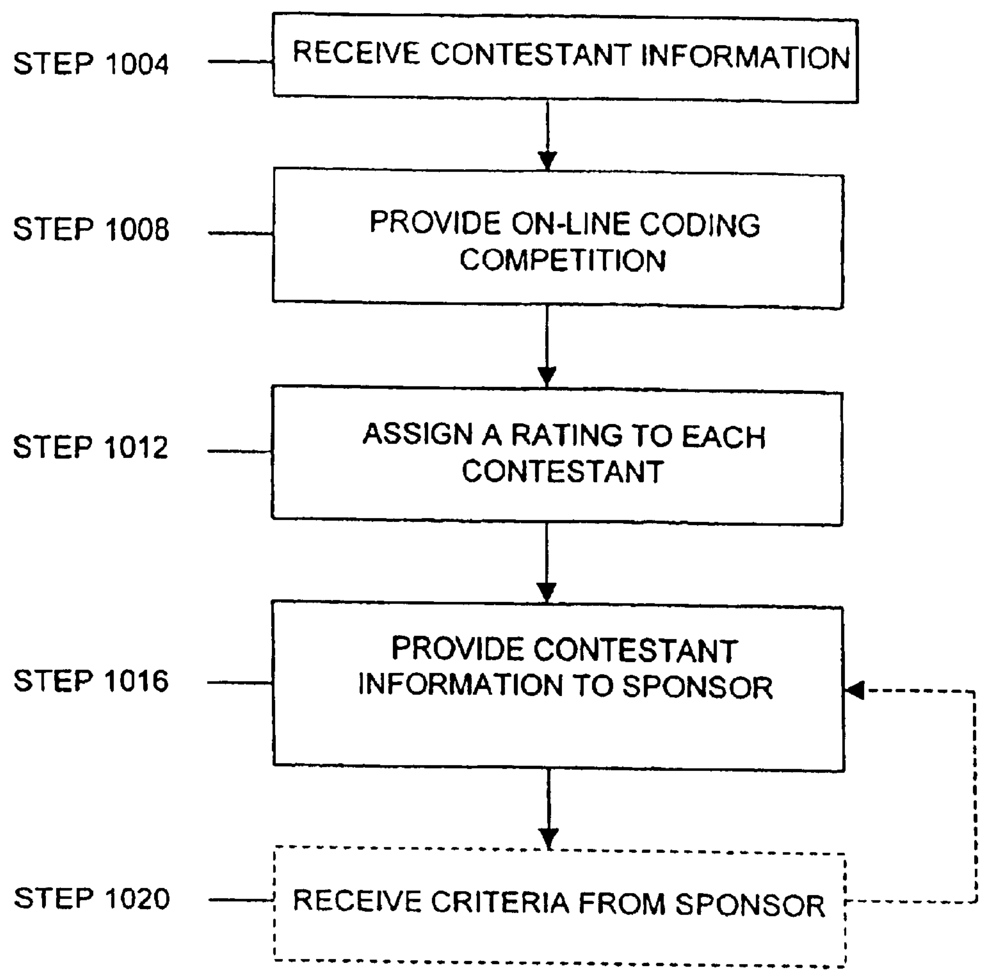
FIG. 10 is a flowchart of the operation of an embodiment of the server for attracting sponsorship of the coding competition.

Referring to FIG. 10, the server 104 may use the ratings for many purposes, including for attracting sponsors to the coding competition. The ratings provide a tangible, objective, and quantifiable way for companies to determine the skill level of a contestant. As above, the server 104 performs the registration stage in which the server 104 receives contestant information (STEP 1004). The server 104 then runs at least one coding competition (STEP 1008) and assigns a rating to each contestant (STEP 1012).

The competition administrator can then use these competitions to attract sponsorship. In particular, the server 104 provides contestant information about one or more contestants to a first sponsor in exchange for sponsorship (STEP 1016). Sponsorship can include many things, but generally includes providing financial support for the competition and/or for the competition administrator. For example, in one embodiment, a sponsor provides the prize money that is awarded to contestants who have scored a higher number of point values relative to a predetermined number of other contestants. Although described below as sponsoring the entire coding competition, a company can also sponsor a part of the coding competition (e.g., a round of a coding competition). In one embodiment, the server 104 causes the client to display a logo and other promotional information associated with a sponsor of the coding competition on the contestant's web browser 116 (FIG. 1) or client software 120 (FIG. 1). Moreover, the server 104 can provide selected contestant information and ratings to a sponsor.

In one embodiment, the competition administrator tailors the information about contestants that the server 104 provides to the sponsor. In this embodiment, the server 104 transmits only portions of contestant information (STEP 1020). For example, the criteria may be a geographic preference for employment, years of work experience, coding language specialty or other specific skills, and current employment status of the contestant (e.g., active job hunting, passive job hunting).

The criteria may also be a rating range that a sponsor will consider for employment opportunities. If the contestant is rated lower than the minimum rating for that sponsor, the server 104 does not provide that contestant's information to the sponsor. In other embodiments, the server 104 receives the criteria from a sponsor at the time the company decides to sponsor the coding competition. Thus, although the reception of the criteria is shown in STEP 1020 after the server 104 provides the contestant information to the sponsor, the server 104 may alternatively receive the criteria before the transmission of information to the sponsor in STEP 1016.

After the server 104 transmits contestant information for particular contestants to a sponsor, the sponsor may then contact the contestant for employment opportunities. In one embodiment, the sponsor communicates with the competition administrator to obtain contestant information for potential employment. Further, the sponsor communicates with the competition administrator and the competition administrator then communicates with the contestant regarding requested information and employment opportunities. Thus, the competition administrator acts as an agent for the contestants to find employment.

In one embodiment, the server 104 provides information to the sponsor about one or more contestants and the sponsor subsequently contacts the contestant. In one embodiment, the sponsor contacts the contestant through a communication service (e.g. electronic messaging) provided by the server 104. In this way, the actual identity of the contestant can be hidden from the prospective employer, and the contestant can decide whether to respond to the inquiries made by the sponsor. Additionally, a contestant who has a high rating relative to other contestants may use that rating to bolster the contestant's negotiating power when negotiating a starting salary and/or benefits with the prospective employer.

In one embodiment, the competition administrator provides one or more advertisements to each contestant for viewing during the competition. The advertisements may be displayed on the web browser, the client software, or some combination. One or more advertisers supply these advertisements to the competition administrator. An advertiser may be a sponsor of the coding competition and may further be a company or firm that hires coders, develops software and/or hardware, and/or is involved with technology. The advertiser may also be the competition administrator. In one embodiment, the server 104 displays one or more advertisements on the client software 120. An advertisement may include, without limitation, a logo, a quote, a word, a paragraph, a picture, or a sound or video clip. The server 104 then tracks the viewing time of the advertisements by each contestant. For instance, the server 104 can determines the amount of time that the client software displayed a particular advertisement. The server 104 then provides contestant information about the contestants viewing the advertisement as well as the tracked viewing time of the advertisement to the advertiser.

In one embodiment, the server 104 provides the same advertisement to each contestant. The server 104 then provides contestant information to the advertiser in the aggregate. The contestant information may include, for instance, the experience of the contestants viewing the advertisement, the rating of each contestant, and/or the geographic preference of each contestant. For example, the server 104 may provide that ten extremely skilled contestants having a rating above or equal to 2000 viewed the advertisement for a total time of 30 minutes, twelve highly skilled programmers having a rating above or equal to 1800 but below 2000 viewed the advertisement for 27 minutes, and twenty skilled programmers having a rating above or equal to 1500 but below 1800 viewed the advertisement for 31 minutes. The server 104 may also provide a list of the time each contestant viewed the advertisement. In some embodiments, the server 104 provides other information about each of the above-mentioned contestants, such as that they have a geographic preference of Chicago, Ill.

In another embodiment, the server 104 provides different advertisements to different contestants based on contestant information. For example, if an advertiser is a computer organization located only in New York and develops software using the Java programming language, the server 104 displays this advertiser's advertisements to contestants having contestant information matching the above information (i.e., geographic preference of New York, knowledgeable in the Java programming language). In one embodiment, the advertiser specifies to the competition administrator (or server 104) that the server 104 should only provide their advertisement to coders having particular information as part of their contestant information. In another embodiment, the server 104 increases the frequency of viewing opportunities of certain advertisements based on information that the server 104 stores related to the particular advertiser.

Figure 11:
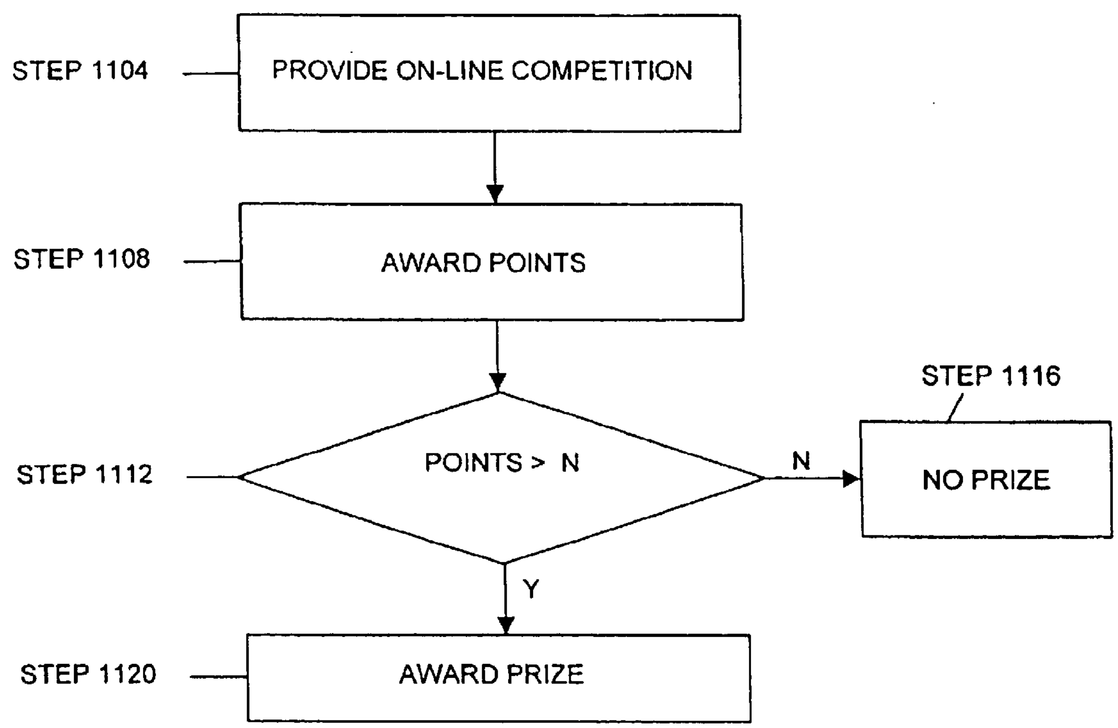
FIG. 11 is a flowchart of the operation of an embodiment of the server for awarding a prize in the coding competition.

Referring to FIG. 11, in addition to access to employment opportunities, a contestant who earned a large number of points in one or more rounds of a tournament relative to other contestants may be awarded one or more prizes. As above, the server 104 provides the coding competition (STEP 1104) and awards points to each contestant during (e.g., points earned after each round) and following (e.g., total points) the competition (STEP 1108). The server 104 determines if a contestant scoring a particular number of points should receive a prize. The server 104 makes this determination based on whether the awarded points are above a predetermined prize point value (STEP 1112) or whether the number of points is greater than the number received by other contestants in the room, division, etc.

If the contestant is to receive a prize, the server 104 notifies the contestant. In one embodiment, different prizes are awarded to the contestant based on the difference between the contestant's awarded points and the predetermined prize point value (STEP 1120). The prize may be a tangible or intangible good. For example, a prize may include, without limitation, a monetary award, a vehicle, a computer, a vacation, and an interview with a potential employer. In a further embodiment, the prize is awarded to charity on behalf of the winner. The prize may be delivered to the contestant in a variety of ways, such as mailing the prize to the contestant or having the contestant pick up the prize at a predefined location. In another embodiment, the coding competition administrator provides capital for one or more prizes.

In one exemplary embodiment, the prize distribution for a single round of competition, is based on the division and the rooms. The contestants are seeded into rooms based on their rating. The contestants in the higher (i.e. lower-numbered) divisions and rooms is as shown in Table II. The prize money for first through third positions of each division and room is as follows:

| Division 1 | | | | |
|---|---|---|---|---|
| Room | Contestants | 1st | 2nd | 3rd |
| 1 | 9 | 635 | 537 | 456 |
| 2 | 9 | 382 | 323 | 274 |
| 3 | 9 | 293 | 248 | 211 |
| 4 | 9 | 249 | 211 | 179 |
| 5 | 10 | 249 | 211 | 179 |
| 6 | 10 | 227 | 192 | 163 |
| 7 | 10 | 211 | 179 | 152 |
| 8 | 10 | 196 | 166 | 141 |
| 9 | 10 | 183 | 155 | 132 |
| 10 | 10 | 172 | 145 | 123 |
| 11 | 10 | 165 | 140 | 119 |
| 12 | 10 | 158 | 133 | 113 |

| Division 2 | | | | |
|---|---|---|---|---|
| Room | Contestants | 1st | 2nd | 3rd |
| 1 | 10 | 91 | 77 | 65 |
| 2 | 10 | 86 | 73 | 62 |
| 3 | 10 | 81 | 69 | 58 |
| 4 | 10 | 73 | 62 | 52 |
| 5 | 10 | 69 | 58 | 49 |
| 6 | 10 | 66 | 56 | 48 |
| 7 | 10 | 63 | 53 | 45 |
| 8 | 10 | 60 | 51 | 43 |
| 9 | 11 | 62 | 52 | 45 |

-continued

| Division 2 | | | | |
|---|---|---|---|---|
| Room | Contestants | 1st | 2nd | 3rd |
| 10 | 11 | 59 | 50 | 43 |
| 11 | 11 | 51 | 43 | 36 |

TABLE II

| Unrated | | | | |
|---|---|---|---|---|
| Room | Contestants | 1st | 2nd | 3rd |
| 1 | 10 | 100 | 0 | 0 |
| 2 | 11 | 0 | 0 | 0 |
| 3 | 11 | 0 | 0 | 0 |

The server 104 may also provide "pick-up" competitions, where contestants communicate with the server 104 at any time and each contestant pays a competition fee to compete. The competition administrator can then distribute a portion of the total amount collected (e.g., total amount collected less a percentage as administration fee) to the winner of the pick-up competition.

In some embodiments, a series of coding competitions are used to identify premier coders. Contestants participate in rounds, with the high scorers for each round participating in the next round. This enables initial participation by a large number of contestants, with the goal of identifying the premier coders in that large number of contestants.

In one exemplary embodiment, a national tournament is held in the United States. In this embodiment, early rounds of the competition take place over the Internet, with each of the contestants participating from home. Regional rounds take place in a central physical location for that region, and a national round is hosted in a large vacation-type setting such as Foxwoods in Ledyard, Conn.; Las Vegas, Nev.; or Orlando, Fla. A sponsor of the coding competition may receive in-person access to contestants during the higher rounds, in the form of contact information, meals, meetings, and requests/performance of services (e.g. programming, publicity, etc.).

Figure 12:
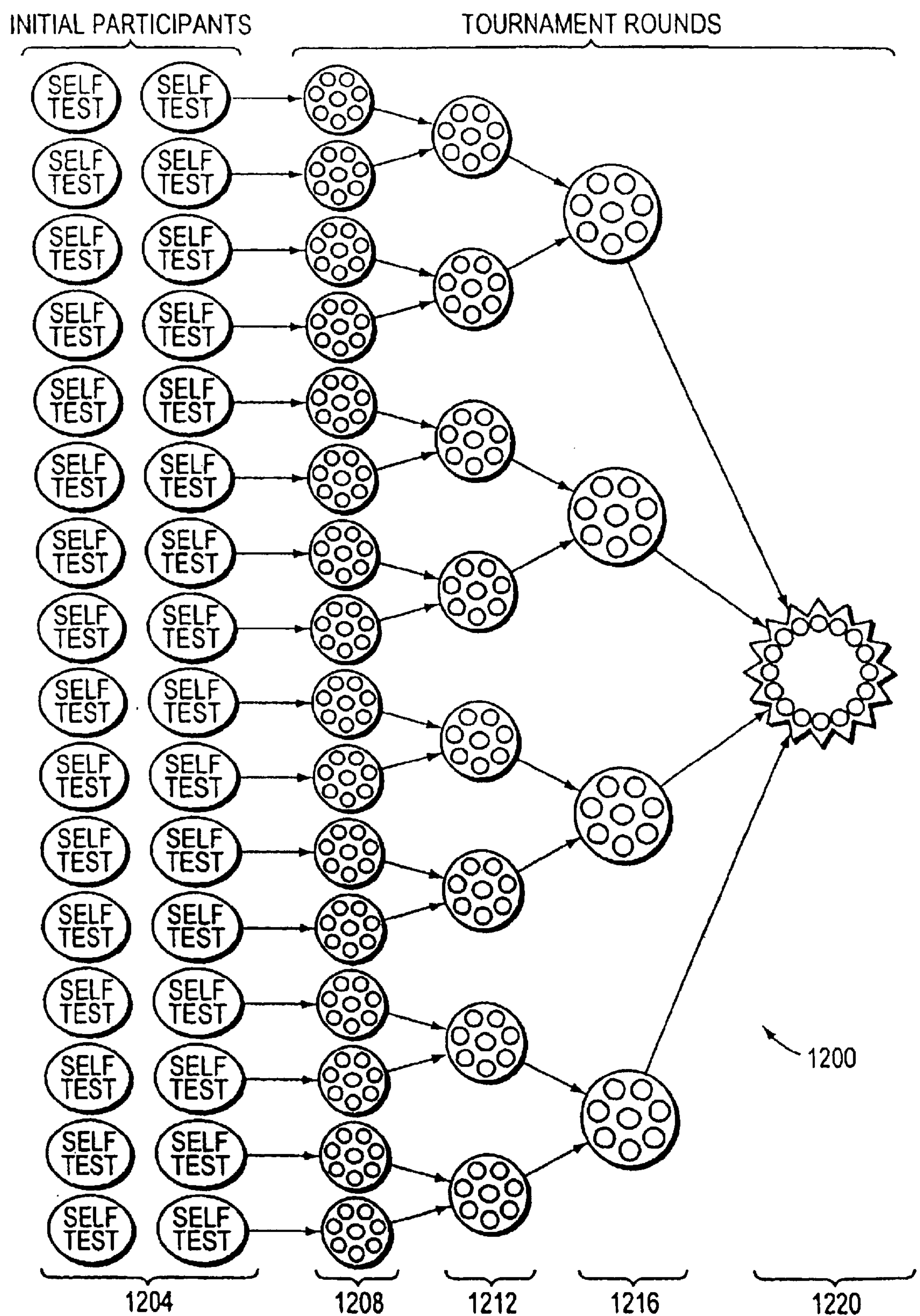
FIG. 12 is a chart of an embodiment of the progress of participants from elimination rounds of competition to a national round of a coding competition.

Referring to FIG. 12, in one embodiment, contestants can progress from a first elimination round 1204 through the national championship 1220 of a competition series. A predetermined number of contestants are invited to compete in the first elimination round 1204, based on rating and/or other factors. In each round, the server 104 divides contestants into groups each having a predetermined number of contestants. Each contestant in the group competes against the other contestants in that group in a virtual room. In another embodiment, the server 104 populates a room with a predetermined number of contestants who have similar ratings. For example, a first virtual room may have the ten contestants with the highest ratings, while another virtual room has ten contestants who have never entered a coding competition before. This sort of room seeding enables fairer competition between contestants. Further, in one embodiment prize money is awarded to one or more contestants in each virtual room who, for instance, accumulate the highest point value for that room. In some embodiments, an effort is made to allocate contestants to virtual rooms by their geographic location, so that they can participate in a regional competition with others from the same region.

In this embodiment, as the stakes increase (e.g., the amount of prizes awarded) from the first preliminary round

1208 to a national round 1220, so does the level of competition. Each round of the competition involves coding, challenge and/or testing. Some of the contestants in the first preliminary round 1208 are eliminated during the first preliminary round 1208, and so fewer number of contestants participate in the second preliminary round 1212. Likewise, still more contestants are eliminated as the process continues into a regional round 1216, in which, in one embodiment, the clients 108 and server 104 are located at one central physical location for that region. Finally, a predetermined number of contestants having the highest points in the regional round 1216 enter a national round 1220. The national round 1220 preferably takes place in one physical location (e.g., a vacation-type setting, or at a large computer conference). It is intended that this embodiment is exemplary, and that other embodiments might include different numbers of rounds, contestants, and locations.

Figure 13:
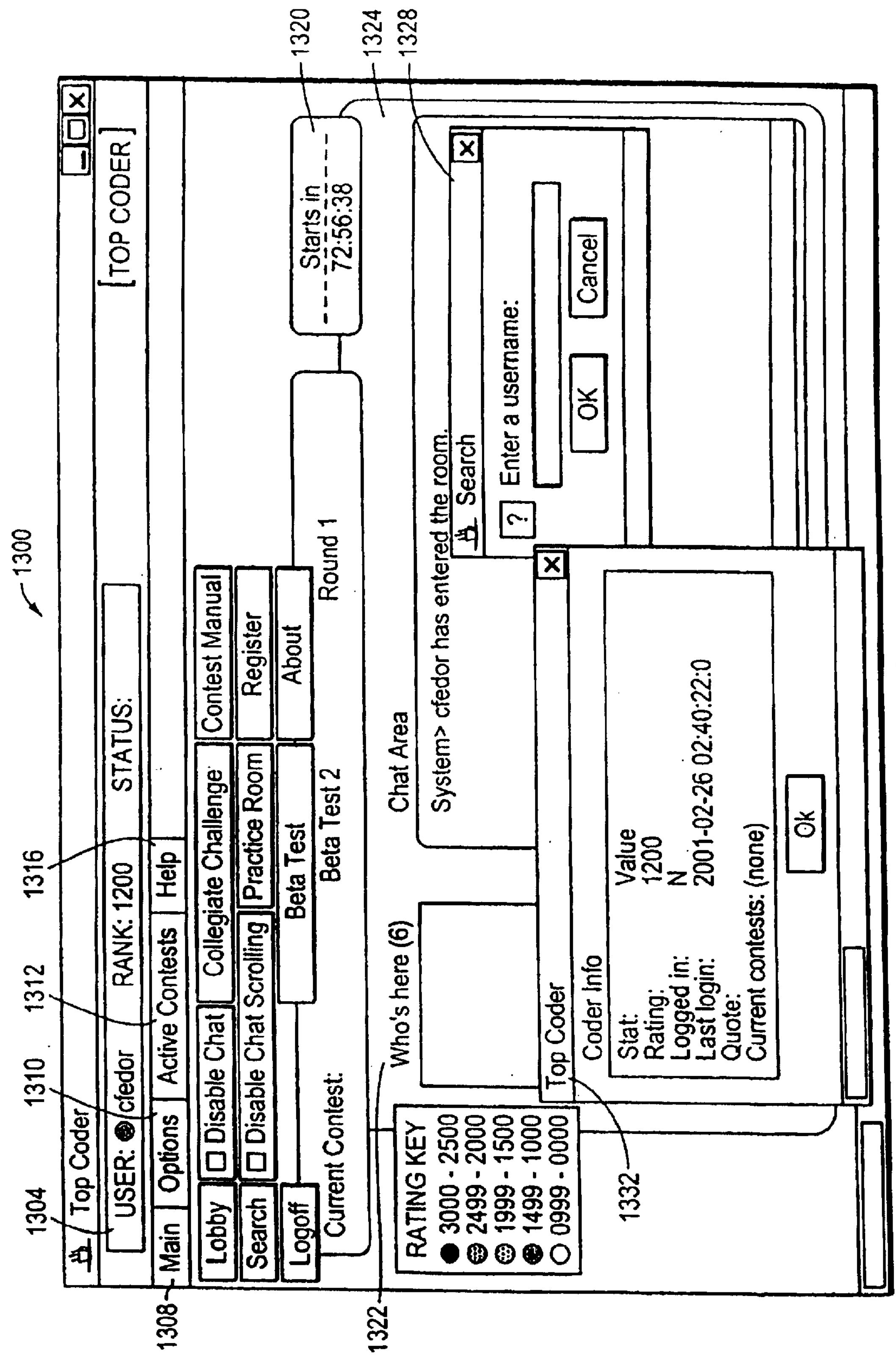
FIG. 13 is an example screen shot of an embodiment of a web page displayed during the coding competition.

Referring to FIG. 13, an example screen shot of an embodiment of a virtual "lobby" area 1300 is shown. In one embodiment, the lobby 1300 is the main web page displayed on the client 108 during a coding competition. The lobby 1300 includes a status panel 1304 which contains, for instance, a contestant's login name, ranking, and status (i.e., whether the contestant is coding or challenging). The lobby 1300 also includes a main menu 1308 providing functions that can be used at any time, such as a search function to search for a particular contestant. The lobby 1300 further includes an options area 1310, providing options to tailor the display of the lobby 1300. An active contest area 1312 is an area displaying the current active competitions (e.g., a practice competition, an actual competition). The lobby 1300 also includes a help area 1316 for a user to retrieve help on a particular item, and a contest timer display 1320 which displays a relevant time related to the coding competition. For instance, the contest timer display 1320 can display a start timer which counts down to the start of the next competition. A legend key 1322 displays the contestants competing in the next coding competition. The lobby 1300 also includes a chat area 1324 which enables contestants in the virtual room to communicate with each other. The lobby 1300 also enables a contestant to search for another contestant via a search box 1328. Additionally, a contestant information window 1332 enables a contestant to find out certain information about another contestant.

Figure 14:
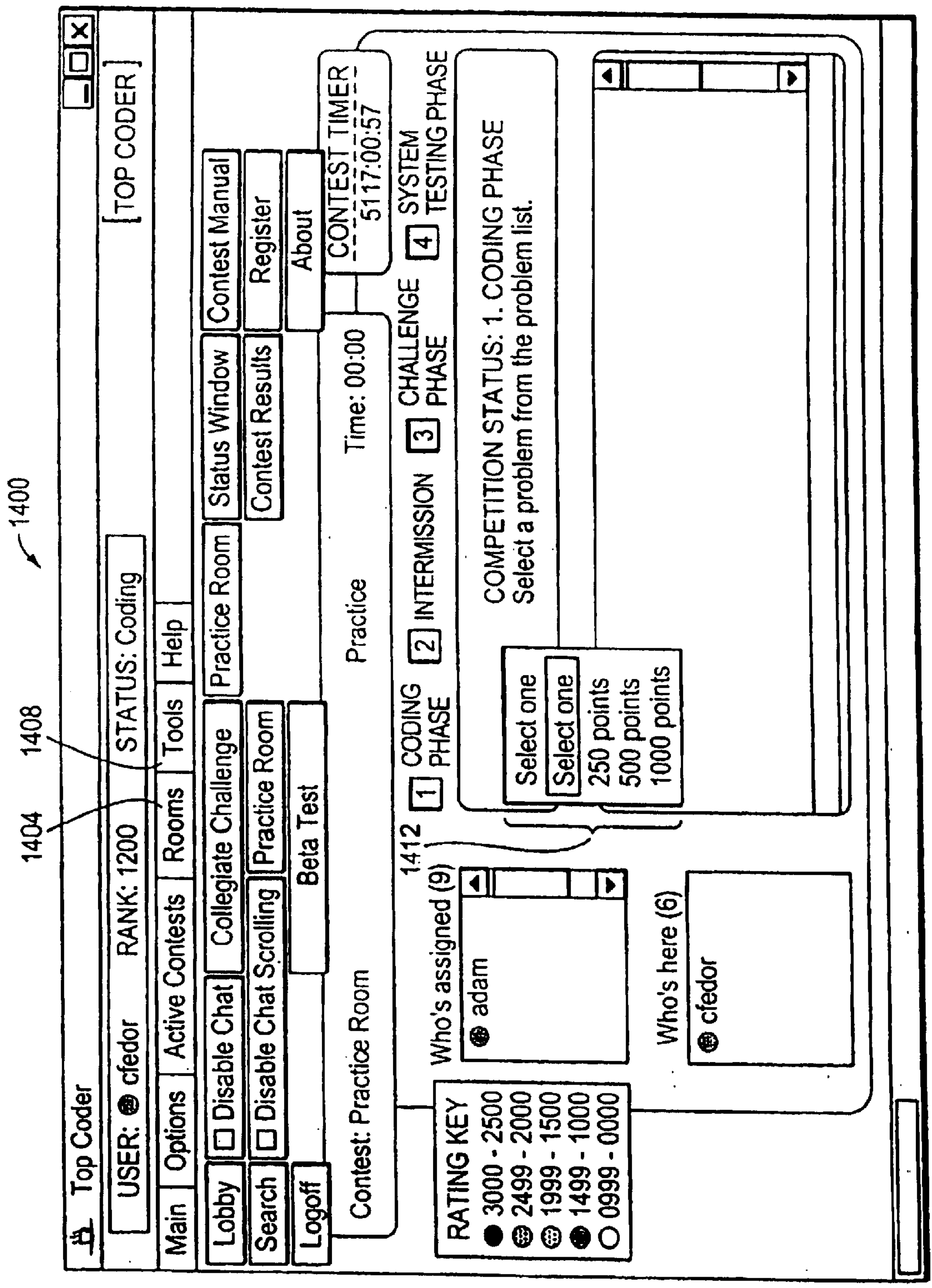
FIG. 14 is an example screen shot of an embodiment of a coding problem selection screen displayed during the coding competition.

Referring to FIG. 14, in the embodiment of FIG. 13, a contestant competing in the coding competition selects one coding problem from several coding problems that the server 104 transmits to each client 108. An exemplary coding problem selection screen 1400 includes a listing 1404 of all virtual rooms that are active. The screen 1400 also includes a tools window 1408. The coding problem selection screen 1400 additionally includes a selection window 1412 where a contestant chooses a coding problem based on a displayed point value for that coding problem. Once a contestant selects a coding problem, the server 104 displays a coding window to enable a contestant to create computer code to solve the coding problem.

Figure 15:
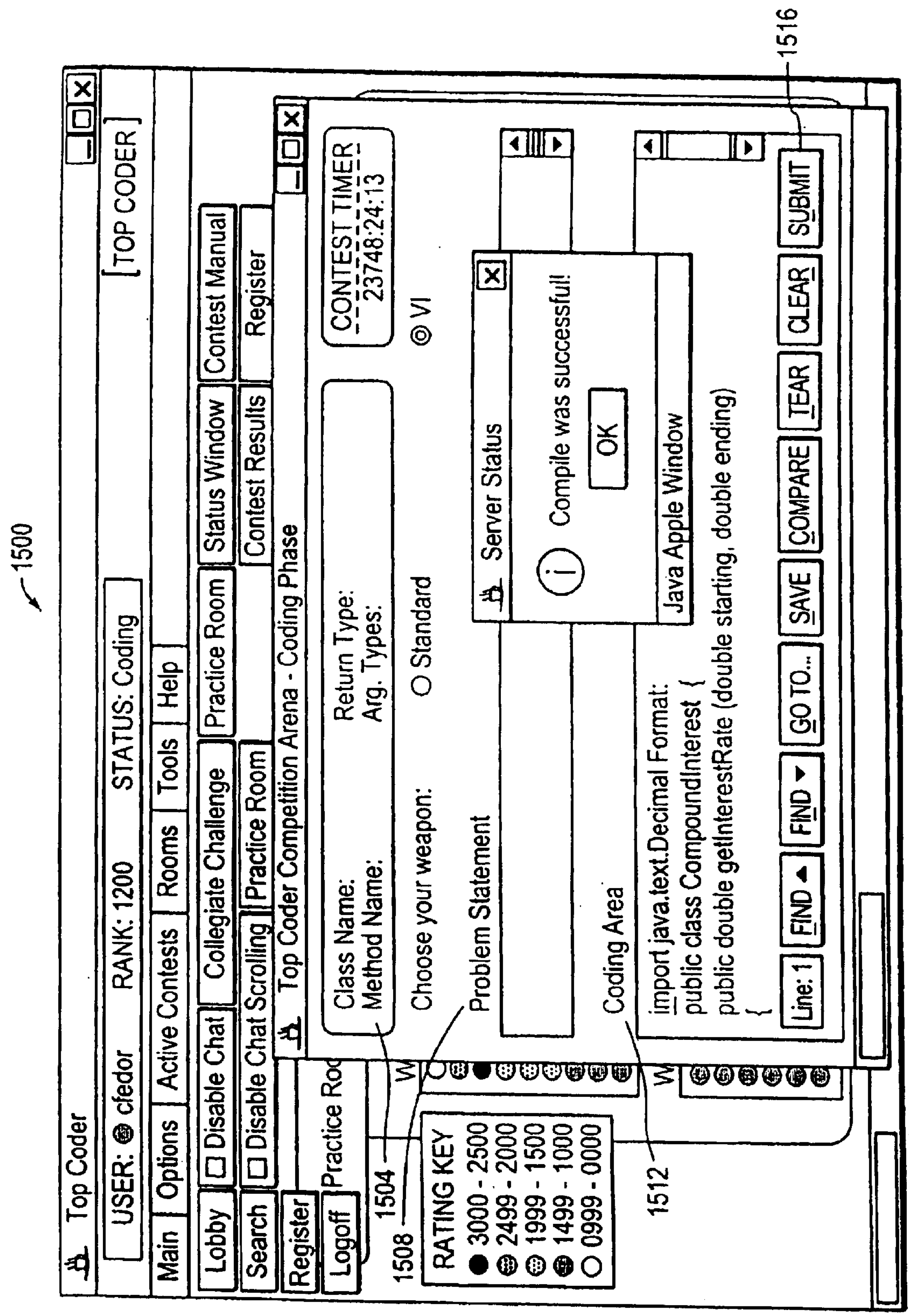
FIG. 15 is an example screen shot of an embodiment of a coding window displayed during the coding competition.

Referring to FIG. 15, an exemplary embodiment of a coding window 1500 includes a problem information window 1504 to display information about the coding problem, such as the method name, class name, return type, and argument types. The coding window 1500 also includes a problem statement window 1508 to display the coding problem. The coding window 1500 additionally includes a coding area 1512 in which the contestant writes computer code attempting to solve the coding problem. Moreover, the coding window 1500 includes an action bar 1516, where the action bar 1516 enables the contestant to perform various actions on the computer code, such as testing the computer code, saving the computer code, and submitting the computer code to the server 104.

Figure 16:
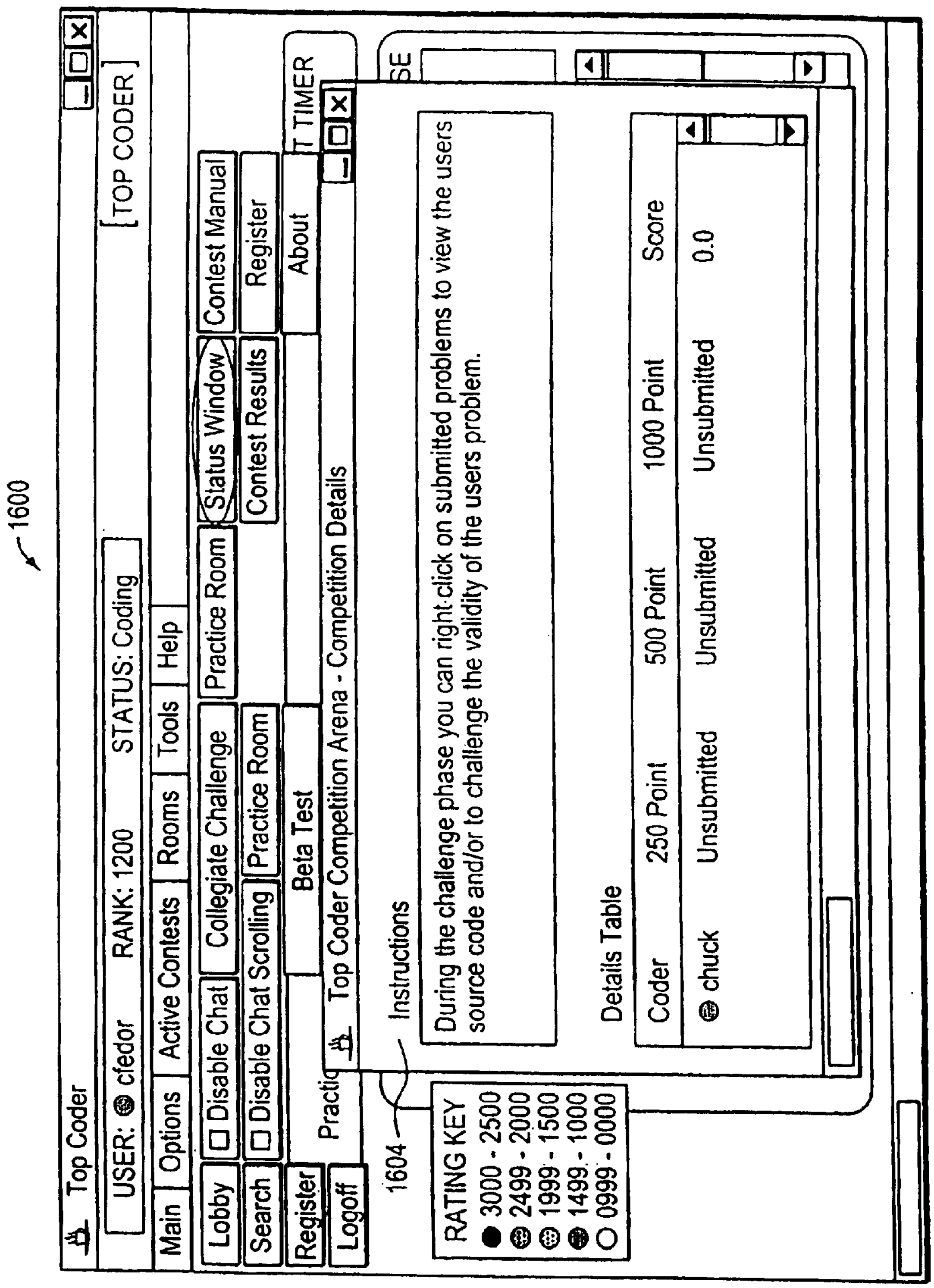
FIG. 16 is an example screen shot of an embodiment of a challenge window displayed during the coding competition.

Referring to FIG. 16, in one exemplary embodiment, after completing the coding stage, the server 104 executes the challenge stage and displays a challenge window 1600. The challenge window 1600 includes a viewing window 1604 that enables a contestant to view other contestants' computer code. The challenge window 1600 also includes a challenge submission window to enable the submission of test data.

In one embodiment, the server 104 assigns teams for a team competition. This assignment may occur, for example, before a competition begins, after a predetermined number of rounds in a competition, or after one competition is complete and for future competitions. In further embodiments, the server 104 assigns teams randomly, based on previous ratings, or based on previous points received by one or more contestant. In other embodiments, contestants form teams. In yet another embodiment, the server 104 elects at least two contestants to be team captains and the team captains select contestants to be members for their team. Furthermore, the server 104 can allow a contestant to be traded from one team to another team. Examples of a trade that one team (e.g., the team captain) can make for one contestant include, but are not limited to, a member of another team, points, and prizes.

A team competition can involve seasons, where teams compete for the best record or point total over a predetermined period of time. Moreover, the server 104 may include separate divisions for teams. In this embodiment, teams with an average rating above a predetermined team rating, for instance, are placed into a higher division. The server 104 may also provide a "handicap" for a team based on average rating advantage. In one embodiment, the server 104 provides this handicap by awarding contestants on the team with handicap points before the contestant begins or during the contestant, without the contestant answering a coding problem.

In some embodiments, the server 104 enables corroboration between contestants on the same team, such that each contestant on a team can view the work and/or progress of other team members. In another embodiment, the server 104 aggregates the scores of the various team members (i.e., disallowing collaboration) to arrive at a team score. In one embodiment, the server 104 provides a team competition in which some or all team members have to use the computer code created by other team members of the team to create the final computer code for submission.

In another embodiment, the contestants compete with respect to hardware logic design. The server 104 provides a coding problem which requests each contestant to design of electronic circuitry and submit the computer code for the circuit design when complete. The coded circuit can then be challenged using test data as input into a simulation of the circuit. The execution of the code, then, is execution of a simulation of the circuit specified by the code. The server 104 can then award points to the contestant based on, for instance, the circuit's efficiency (e.g. number of components, projected implementation cost, maximum input and response speed, etc.), correctness in its response relative to a predetermined solution, and success with respect to the test data. Simple examples of a coding problem for a circuit would be design of an eight-bit a multiplication circuit (i.e., a circuit which multiplies two numbers) using specified logic gates in the digital hardware domain, or the design of a low-pass filter in the analog domain. Likewise, the system and methods of the invention can be applied to coding in other computer and non-computer disciplines. If the result can be coded, and then the code executed or simulated then the principles described above apply. For example, in the field of civil engineering, with the proper tools, a portion of a bridge design (e.g. support truss) can be coded and the coded design can be tested with test stresses during simulation. In the field of aeronautical engineering, an airplane wing elevator design can be coded and the result subjected to various inputs (e.g. shifts in wind, angle, etc.) during simulation. Thus, with the appropriate coding tools, compilers, and execution environment, the method and systems described can be extended to coding in various disciplines.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for evaluating a skill level of a contestant in a computer programming competition, the contestant having a previous rating prior to the competition, comprising:

(a) electronically communicating a coding problem to three or more contestants at a first time during a competition;

(b) electronically receiving computer code in response to the coding problem from one of the contestants at a second time during the competition;

(c) automatically evaluating the received computer code;

(d) awarding points to the one of the contestants in response to the evaluation of the received computer code and the time difference between the second time and the first time; and (e) determining a subsequent rating for the one of the contestants after the competition in response to the number of points awarded to the one of the contestants and a previous rating of the one of the contestants prior to the competition.

2. The method of claim 1 wherein step (e) further comprises determining an average rating for the competition based on previous ratings of the contestants and a total number of contestants receiving the coding problem.

3. The method of claim 2 wherein step (e) further comprises determining a competition factor for the competition based on at least one of previous ratings of contestants, a total number of contestants receiving the coding problem, and volatility of the ratings of the contestants.

4. The method of claim 3 wherein step (e) further comprises determining a skill for the one of the contestants based on the previous rating of the one of the contestants.

5. The method of claim 4 wherein step (e) further comprises determining a deviation value for the one of the contestants relative to other contestants based on the volatility of the ratings of the contestants.

6. The method of claim 5 wherein step (e) further comprises estimating a probability of awarding the one of the contestants more points than other contestants in the competition.

7. The method of claim 6 wherein step (e) further comprises calculating at least one of an expected performance, an expected rank, and an actual performance for the one of the contestants.

8. The method of claim 7 wherein step (e) further comprises calculating a new rating volatility of the one of the contestants.

9. The method of claim 8 further comprising determining a maximum rating increase for the one of the contestants.

10. The method of claim 9 further comprising determining a weighting effect of the competition for the one of the contestants.

11. The method of claim 1 wherein the step of determining a subsequent rating for the one of the contestants further comprises adjusting the rating in smaller increments as the frequency that the one of the contestants has been rated increases.

12. The method of claim 1 wherein step (c) further comprises immediately evaluating the received computer code.

13. The method of claim 1 wherein the step of determining the subsequent rating for the one of the contestants is further in response to the previous ratings of the contestants prior to the competition.

14. The method of claim 13 wherein the step of determining the subsequent rating for the one of the contestants is further in response to points awarded to the contestants other than the one of the contestants during the competition.

15. A system for evaluating a skill level of a contestant in a computer programming competition, the contestant having a previous rating prior to the competition, comprising:

a client interface server for electronically communicating a coding problem to three or more contestants at a first time during a competition;

a testing engine in communication with the client interface for automatically evaluating code submitted by one of the contestants in response to the coding problem at a second time during the competition;

a scoring engine for awarding points to the one of the contestants in response to the submitted code and the time difference between the second time and the first time; and a rating engine for assigning a subsequent rating to the one of the contestants in response to the number of points awarded to the one of the contestants and the previous rating of the one of the contestants.

16. The system of claim 15 wherein the rating engine further calculates an average rating for the competition based on the previous ratings of the contestants and a total number of contestants receiving the coding problem.

17. The system of claim 16 wherein the rating engine further calculates a competition factor for the competition based on at least one of the previous ratings of contestants, a total number of contestants receiving the coding problem, and the volatility of the previous ratings of the contestants.

18. The system of claim 17 wherein the rating engine further calculates a skill for the one of the contestants based on the previous rating of the one of the contestants.

19. The system of claim 18 wherein the rating engine further calculates a deviation value for the one of the contestants relative to other contestants based on the volatility of the previous ratings of the contestants.

20. The system of claim 19 wherein the rating engine further estimates a probability of awarding the one of the contestants more points than other contestants in the competition.

21. The system of claim 20 wherein the rating engine further calculates at least one of an expected performance, an expected rank, and an actual performance for the one of the contestants.

22. The system of claim 21 wherein the rating engine further calculates a subsequent volatility of the rating for the one of the contestants.

23. The system of claim 22 wherein the rating engine further calculates a maximum rating increase for the one of the contestants.

24. The system of claim 23 wherein the rating engine further calculates a weighting effect of the competition for the one of the contestants.

25. The system of claim 23 wherein the rating engine adjusts the rating in smaller increments as the frequency that the one of the contestants has been rated increases.

26. The system of claim 15 wherein:

the computer programming competition has a plurality of contestants; and the rating engine assigns the subsequent rating to the contestant in response to the number of points awarded to the contestant in the competition and the previous ratings of each of the plurality of contestants.

27. The system of claim 26 wherein the rating engine assigns the subsequent rating to the one of the contestants in response to the number of points awarded to each of the plurality of contestants and the previous ratings of each of the plurality of contestants.

* * * * *